US010066429B2

(12) United States Patent
Park et al.

(10) Patent No.: US 10,066,429 B2
(45) Date of Patent: Sep. 4, 2018

(54) HINGE WITH MINIMIZED FREE PLAY

(71) Applicant: Microsoft Technology Licensing, LLC, Redmond, WA (US)

(72) Inventors: Daniel Clark Park, Woodinville, WA (US); Brian Bitz, Woodinville, WA (US); Brett Andrew Tomky, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 15/334,978

(22) Filed: Oct. 26, 2016

(65) Prior Publication Data
US 2018/0113491 A1    Apr. 26, 2018

(51) Int. Cl.
*E05D 1/04* (2006.01)
*G06F 1/16* (2006.01)
*F16M 11/38* (2006.01)
*E05D 11/08* (2006.01)

(52) U.S. Cl.
CPC .............. *E05D 1/04* (2013.01); *E05D 11/082* (2013.01); *F16M 11/38* (2013.01); *G06F 1/1681* (2013.01); *E05Y 2900/606* (2013.01); *Y10T 16/54035* (2015.01)

(58) Field of Classification Search
CPC combination set(s) only.
See application file for complete search history.

(56) References Cited

U.S. PATENT DOCUMENTS

| 375,394 | A | * | 12/1887 | Strachan | E05D 1/04 16/355 |
| 457,824 | A | * | 8/1891 | Curtis | E05D 1/04 16/355 |
| 2,056,805 | A | * | 10/1936 | Reichard | E05D 1/04 16/355 |
| 2,770,834 | A | * | 11/1956 | Saverio | E05D 1/04 16/250 |

(Continued)

FOREIGN PATENT DOCUMENTS

EP    2742197 A1    6/2014

OTHER PUBLICATIONS

"International Search Report and Written Opinion Issued in PCT Application No. PCT/US2017/056707", Dated: Feb. 8, 2018, 17 Pages.

*Primary Examiner* — Jeffrey D O Brien
(74) *Attorney, Agent, or Firm* — Lempia Summerfield Katz LLC

(57) ABSTRACT

Disclosed herein are hinge devices having reduced or minimized free play. Specifically, disclosed herein are hinge devices having surface elements positioned on a surface of a hinge component to reduce or eliminate any free play present between interacting hinge components. In one or more embodiments, the hinge includes a first hinge component having a first guide and a second hinge component having a second guide, wherein the second hinge component is rotatably mounted on at least one surface of the first hinge component such that the first guide is positioned within the second guide or the second guide is positioned within the first guide. At least one surface element is disposed on a surface of the first guide or the second guide to provide a reduction in free play at a location of the at least one surface element.

19 Claims, 22 Drawing Sheets

(56) References Cited

U.S. PATENT DOCUMENTS

| | | | | |
|---|---|---|---|---|
| 5,107,401 A | * | 4/1992 | Youn | G06F 1/1616 16/357 |
| 5,406,678 A | * | 4/1995 | Kaden | G06F 1/1616 16/342 |
| 6,292,981 B1 | * | 9/2001 | Ford | E05D 1/04 16/357 |
| 6,317,929 B1 | | 11/2001 | Ring | |
| 6,470,532 B2 | | 10/2002 | Rude | |
| 7,192,105 B2 | * | 3/2007 | Jung | E05D 11/1064 312/405 |
| 7,958,599 B2 | | 6/2011 | Easley | |
| 8,118,274 B2 | * | 2/2012 | McClure | F16M 11/125 248/455 |
| 8,243,432 B2 | * | 8/2012 | Duan | H05K 5/0234 248/188.8 |
| 8,248,791 B2 | * | 8/2012 | Wang | F16M 11/10 248/188.8 |
| 8,267,368 B2 | * | 9/2012 | Torii | F16M 11/10 248/188.8 |
| 8,403,288 B2 | * | 3/2013 | Cheng | F16M 11/10 248/673 |
| 9,134,808 B2 | * | 9/2015 | Siddiqui | G06F 1/1618 |
| 9,304,549 B2 | * | 4/2016 | Siddiqui | E05D 7/00 |
| 9,317,072 B2 | * | 4/2016 | Park | G06F 1/1681 |
| 9,404,298 B1 | * | 8/2016 | Chen | G06F 1/1681 |
| 9,447,620 B2 | * | 9/2016 | Park | E05D 11/10 |
| 9,512,655 B2 | * | 12/2016 | Kuo | E05D 1/04 |
| 9,549,479 B2 | * | 1/2017 | Gault | H05K 5/0226 |
| 9,752,361 B2 | * | 9/2017 | Park | E05D 11/082 |
| 9,759,242 B2 | * | 9/2017 | Hsu | F16B 1/00 |
| 9,822,567 B1 | * | 11/2017 | Lin | E05D 11/06 |
| 9,864,415 B2 | * | 1/2018 | Siddiqui | E05D 1/04 |
| 9,904,327 B2 | * | 2/2018 | Whitt, III | G06F 1/166 |
| 2005/0273978 A1 | | 12/2005 | Norman, Jr. | |
| 2006/0090298 A1 | * | 5/2006 | Kitamura | F16F 1/32 16/337 |
| 2006/0123595 A1 | * | 6/2006 | Duan | H04M 1/0216 16/337 |
| 2006/0272128 A1 | * | 12/2006 | Rude | E05D 11/084 16/342 |
| 2007/0157433 A1 | | 7/2007 | Lu et al. | |
| 2007/0164191 A1 | * | 7/2007 | Kim | F16C 11/10 248/686 |
| 2008/0256748 A1 | * | 10/2008 | Saito | F16M 11/10 16/321 |
| 2010/0037431 A1 | * | 2/2010 | Chiang | G06F 1/1616 16/342 |
| 2010/0133414 A1 | * | 6/2010 | Lee | H04M 1/0297 248/686 |
| 2010/0142130 A1 | * | 6/2010 | Wang | H04M 1/04 361/679.01 |
| 2010/0259876 A1 | * | 10/2010 | Kim | F16M 11/10 361/679.01 |
| 2010/0282923 A1 | * | 11/2010 | Wang | F16M 11/10 248/158 |
| 2011/0197392 A1 | * | 8/2011 | Yamaoka | E05D 11/1014 16/82 |
| 2013/0015311 A1 | * | 1/2013 | Kim | H05K 5/0234 248/393 |
| 2013/0128443 A1 | * | 5/2013 | Tseng | G06F 1/1616 361/679.12 |
| 2013/0229773 A1 | | 9/2013 | Siddiqui et al. | |
| 2014/0174960 A1 | * | 6/2014 | Zhu | H04M 1/04 206/45.24 |
| 2014/0293534 A1 | | 10/2014 | Siddiqui | |
| 2015/0022961 A1 | | 1/2015 | Jenkins et al. | |
| 2015/0212553 A1 | * | 7/2015 | Park | G06F 1/1681 361/679.27 |
| 2015/0342067 A1 | | 11/2015 | Gault et al. | |
| 2016/0090767 A1 | | 3/2016 | Park et al. | |
| 2017/0208703 A1 | * | 7/2017 | Lin | E05F 1/1016 |

* cited by examiner

HINGE WITH MINIMIZED FREE PLAY

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, the devices may be designed to be used in a handheld manner. Traditional ways of adapting mobile devices for other uses (e.g., on a table or other surface) tend to be awkward and detract from the mobile aesthetic associated with mobile devices.

SUMMARY

Hinges and devices or systems including hinges are described herein. In one or more embodiments, the hinge includes a first hinge component having a first guide and a second hinge component having a second guide, wherein the second hinge component is rotatably mounted on at least one surface of the first hinge component such that the first guide is positioned within the second guide or the second guide is positioned within the first guide. At least one surface element is disposed on a surface of the first guide or the second guide to provide a reduction in free play at a location of the at least one surface element.

In another embodiment, the hinge includes a hinge frame configured to be connected to a chassis of an electronic device; a cam configured to be connected to a support component of the electronic device, wherein the cam is in communication with the hinge frame; a telescoping link having a first end and a second end, the first end being pivotally connected to the cam or a hinge component connected to the cam, an anchor link having a first end and a second end, the first end being pivotally connected to the hinge frame and the second end having an opening, wherein the second end of the telescoping link is positioned within the opening of the anchor link and is configured to slide within the opening between the first end and the second end of the anchor link as the cam moves between a plurality of positions relative to the hinge frame, and wherein a surface element is disposed on a surface of the telescoping link or a surface of the anchor link to provide a reduction in free play at a location of the surface element as the telescoping link slides within the opening.

In another embodiment, an electronic device includes a chassis, a support component, and a hinge configured to pivotally connect the support component with the chassis, the hinge being positionable in a plurality of positions relative to the chassis. The hinge includes a hinge frame connected to the chassis, the hinge frame having a hinge guide; at least one support plate having a first support plate guide positioned on a first surface and a second support plate guide positioned on a second surface of the at least one support plate, the second surface being an opposite surface of the first surface, wherein the at least one support plate is rotatably mounted on a surface of the hinge frame such that the first support plate guide is positioned within the hinge guide or the hinge guide is positioned within the first support plate guide, defining a first interaction; and a cam connected to the support component, the cam having a cam guide, wherein the cam is rotatably mounted on a surface of the at least one support plate such that the cam guide is positioned within the second support plate guide or the second support plate guide is positioned within the cam guide, defining a second interaction. At least one surface element is disposed on a surface of one or more of the hinge guide, the first support plate guide, the second support plate guide, or the cam guide to provide a reduction in free play at a location of the surface element of the first interaction or the second interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
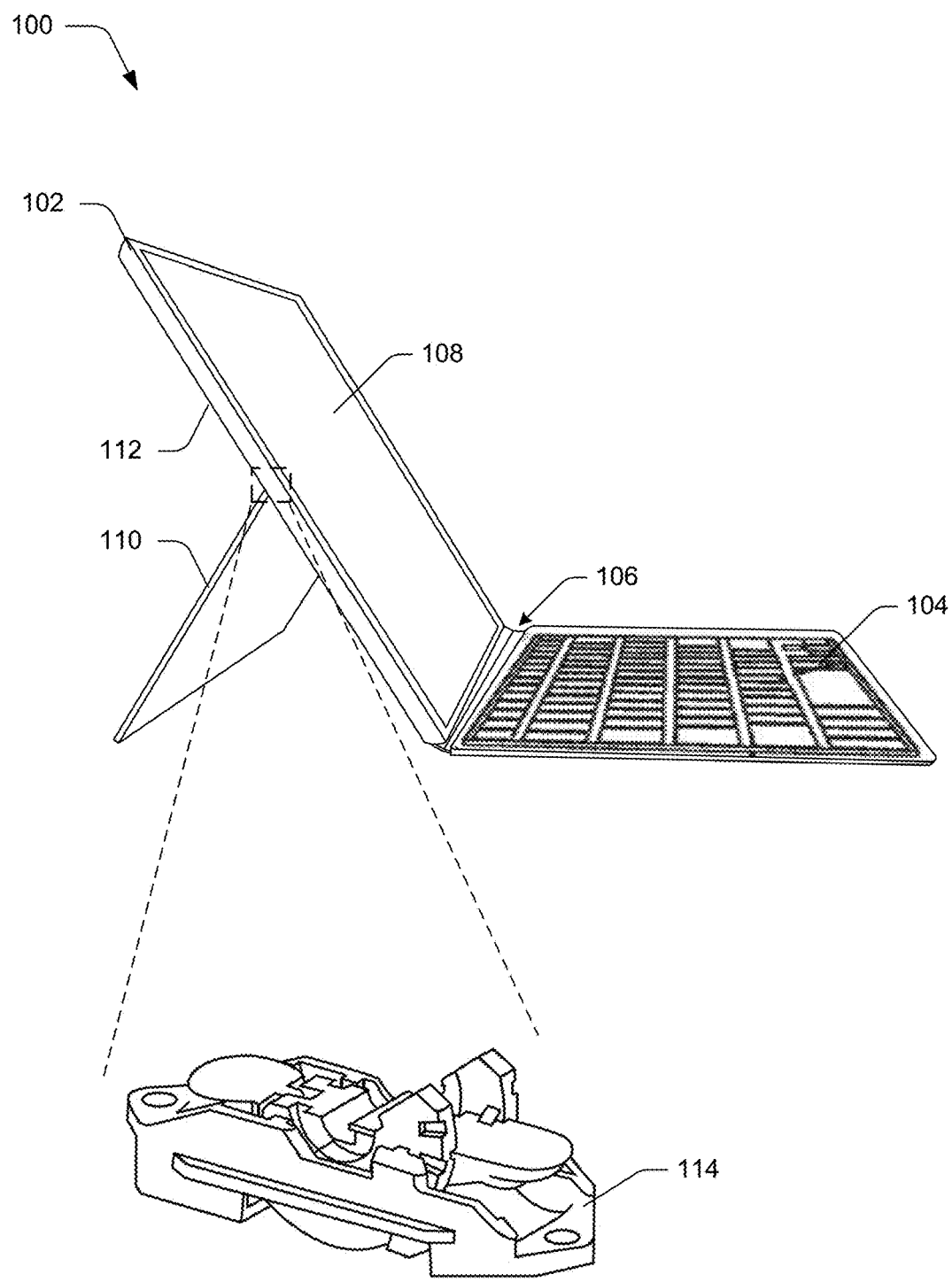
FIG. 1 is an illustration of an environment in an example implementation that is operable to employ the techniques described herein in accordance with one or more examples.

While the disclosed devices and systems are representative of exemplary embodiments in various forms, specific examples are illustrated in the drawings (and are hereafter described), with the understanding that the disclosure is intended to be illustrative, and is not intended to limit the claim scope to the specific exemplary embodiments described and illustrated herein.

DETAILED DESCRIPTION

Disclosed herein are hinge devices having reduced or minimized free play. Specifically, disclosed herein are hinge devices having elements added to a surface of a hinge component (i.e., surface elements) to reduce or eliminate any free play present between interacting hinge components.

As used herein, "free play" may refer to unrestricted movement between components of an electronic device, e.g., a hinge of an electronic device. Hinges used in consumer electronics may require clearance between hinge components to allow the parts to translate between each other. This clearance must be large enough to work over the range of tolerance of the manufactured parts. The end result is a loose feeling or free play between certain components of the hinge, or certain components in communication with the hinge.

As used herein, a "reduction in free play" may refer to a reduction in a gap between interacting hinge components. As described herein, a surface element may be added to a surface of a first hinge component to reduce the gap or space between the first hinge component and a second, connected and interacting hinge component (as compared with interacting hinge components without a surface element on at least one of the hinge components). This reduction in the gap between interacting hinge components may refer to an elimination of the gap entirely between the two components (e.g., via a form fit arrangement or an interference fit arrangement, both of which are described in greater detail below).

Such hinge devices with a reduction in free play, as well as devices or systems including the hinge device, have several potential end-uses or applications, including any electronic or computing devices. The electronic device may be configured as a personal computer (PC), tablet and other handheld computing device (as depicted), laptop or mobile computer, communications device such as mobile phone, multiprocessor system, microprocessor-based system, programmable consumer electronic, minicomputer, audio or video media player, or wearable electronic device.

In at least some implementations, the hinge device enables a support component to be adjustably attached to an apparatus, such as a computing device. For example, the hinge device may be employed to rotatably attach a support component (e.g., a kickstand) to a mobile computing device. The support component may be rotated via the hinge mechanism to various positions to provide support for different orientations of the computing device. For example, through the minimizing or eliminating of any free play associated with the hinge, an end-user is provided with an improved experience using the computing device (e.g., the end-user may be able to rotate the kickstand attached to the hinge throughout a plurality of orientations without any loose feeling or free play in the kickstand or attached hinge).

In the following discussion, an example environment is first described that may employ the techniques described herein to minimize or eliminate free play between hinge components. Examples discussed herein are not limited to the example environment, and the example environment is not limited to examples discussed herein. Additionally, example device orientations and an example support component is described in accordance with one or more examples. Following this, example hinges for support component attachment are discussed in accordance with one or more examples. Finally, an example system and device are discussed that may implement various techniques described herein.

Various examples of such hinge devices are discussed in further detail below.

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured as a personal computer (PC), tablet and other handheld computing device (as depicted), laptop or mobile computer, communications device such as mobile phone, multiprocessor system, microprocessor-based system, programmable consumer electronic, minicomputer, or audio or video media player. In certain examples, the computing device 102 is a wearable electronic device, wherein the device may be worn on or attached to a person's body or clothing. The wearable electronic device may be attached to a person's shirt or jacket; worn on a person's wrist, ankle, waist, or head; or worn over their eyes or ears. Such wearable devices may include a watch, heart-rate monitor, activity tracker, or head-mounted display.

While implementations presented herein are discussed in the context of a tablet device, it is to be appreciated that various other types and form factors of devices may be utilized in accordance with the claimed implementations.

Thus, the computing device 102 may range from full resource devices with substantial memory and processor resources, to a low-resource device with limited memory and/or processing resources. An example implementation of the computing device 102 is discussed below with reference to FIG. 20.

In the illustrated example of FIG. 1, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

The computing device 102 further includes a display 108 and a support component 110. The display 108 is configured as a visual output functionality of the computing device 102. The support component 110 is rotatably and/or pivotally attached to a chassis or rear surface 112 of the computing device 102 via one or more instances of a hinge 114. For instance, the support component 110 is pivotable via the hinge 114 to different angles relative to the chassis or rear surface 112 to support different orientations of the computing device 102. An enlarged side view of the hinge 114 is presented here, and further attributes and implementations of the hinge 114 are detailed below.

Figure 2:
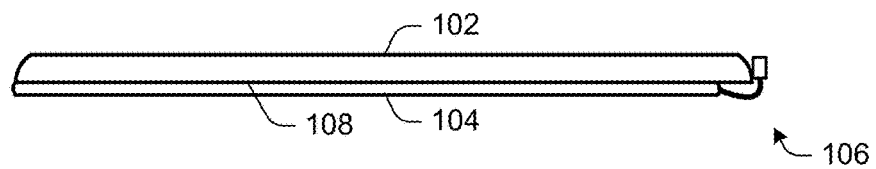
FIG. 2 depicts an example orientation of the input device in relation to the computing device as covering a display device of the computing device in accordance with one or more examples.

According to various examples, a variety of different orientations of the computing device 102 are supported. For example, rotational movement may be supported by the flexible hinge 106 such that the input device 104 may be placed against the display 108 of the computing device 102 and thereby act as a cover as shown in the example orientation 200 of FIG. 2. Thus, the input device 104 may act to protect the display 108 of the computing device 102 from harm.

Figure 3:
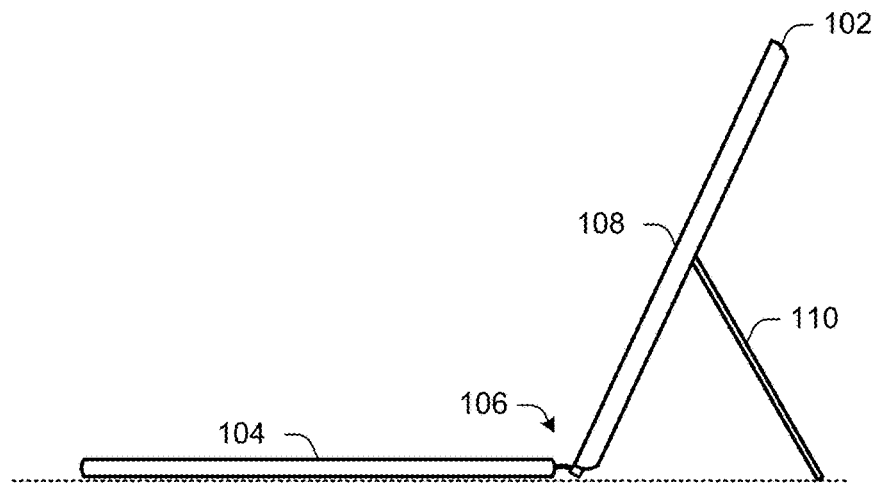
FIG. 3 depicts an example orientation of the input device in relation to the computing device as assuming a typing orientation in accordance with one or more examples.

As shown in the example orientation 300 of FIG. 3, a typing arrangement may be supported. In this orientation, the input device 104 is laid flat against a surface and the computing device 102 is disposed at an angle to permit viewing of the display 108, e.g., such as through use of the support component 110 disposed on the chassis or rear surface 112 of the computing device 102. The described support component may be employed as a support component to enable a variety of different orientations for the computing device 102. For instance, consider the following implementations of a support component in accordance with various examples.

Figure 4A:
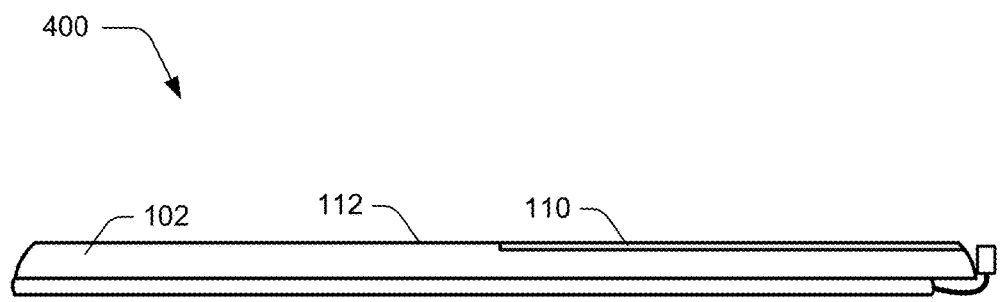
FIG. 4A depicts an example orientation of a computing device with a support component in accordance with one or more examples.

FIG. 4A depicts an orientation 400, and includes the support component 110 in a closed position. In the closed position, the support component 110 forms a portion of the rear surface 112 of the computing device 102 such that the support component 110 conforms to a surface contour of the computing device 102. For instance, when the support component 110 is in the closed position, the support component 110 integrates into the computing device 102 and does not protrude from a plane formed by the rear surface 112.

Figure 4B:
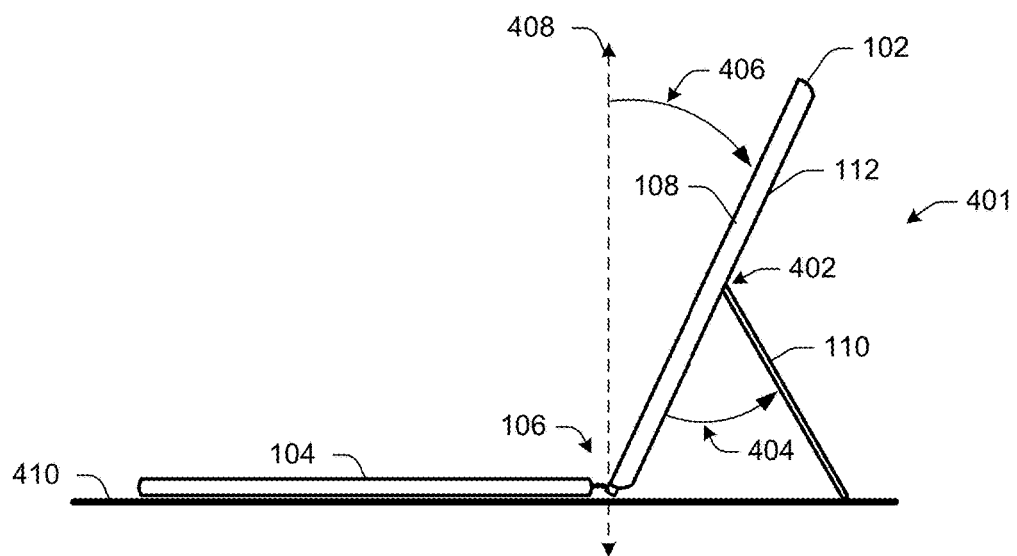
FIG. 4B depicts an example orientation of a computing device with a support component in accordance with one or more examples.

FIG. 4B depicts that the support component 110 may be rotated away from the rear surface 112 of the computing device 102 to a position 401. For instance, the support component 110 may be rotatably attached to the computing device 102 along a seam 402 via a hinge mechanism.

In at least some implementations, the position 401 corresponds to a preset position for the support component 110. For instance, when a user applies pressure to the support component 110 away from the rear surface 112, the support component 110 may snap into the position 401. In certain examples, the hinge mechanism is configured to attach the support component 110 to the computing device 102 and utilize spring pressure and detent settings to provide preset open positions for the support component 110. In this example, the position 401 is associated with an angle 404 between the rear surface of the computing device 102 and the support component 110. For instance, the angle 404 may range from 45 degrees (45°) to 55 degrees (55°). Any suitable angle and/or range of angles may be employed, however.

According to various implementations, the position 401 places the front surface of the display 108 at an angle 406 relative to a vertical line 408. The vertical line 408, for instance, is normal (e.g., 90°) to a surface 410 on which the computing device 102 and the support component 110 are disposed. In this particular example, the angle 406 is approximately 24°, +/−3°. The angle 406, for instance, is one-half of the angle 404.

As illustrated, the input device 104 may be rotated away from the computing device 102 while the computing device 102 is supported by the support component 110. The position 401, for instance, enables the display 108 to be viewed and input to be provided to the computing device 102 via the input device 104. Alternatively, or additionally, the position 401 enables a user to interact with a touchscreen portion of the display 108.

The support component 110 may be rotated away from the chassis or rear surface 112 of the computing device 102 to additional positions other than position 401. In some examples, the support component 110 may be rotated further past the position 401 such that the angle created between the rear surface 112 and support component 110 is larger than angle 404 in FIG. 4B.

In at least some examples, the additional positions correspond to further preset positions for the support component 110, wherein the support component 110 may snap into the respective preset position. Alternatively, the additional positions may not necessarily be configured as preset positions. That is, any position or angle between the rear surface 112 and support component 110 may be possible between a closed and fully open configuration.

While FIG. 4B depicts the computing device 102 with an input device, in some examples, the computing device 102 may be separated from or not include an input device 104. In other words, in at least some examples, the input device 104 may be separated from the computing device 102 such that the computing device 102 has functionality independent of the input device 104. For example, the flexible hinge 106 may employ a magnetic attachment mechanism that holds the input device 104 to the computing device 102 via magnetic force. Thus, a user may grasp the computing device 102 and the input device 104, and may pull the two apart by overcoming the magnetic attraction between them.

When separate from the input device 104, the computing device 102 may provide various functionality. For example, a user may view content via the computing device 102, such as movies and/or streaming content. Further, a user may interact with touch screen functionality of the display 108.

Thus, placing the support component 110 in the position 401 may enable a user to place the computing device in a landscape and/or portrait orientation, and to view and/or interact with the computing device in such orientations.

Figure 5:
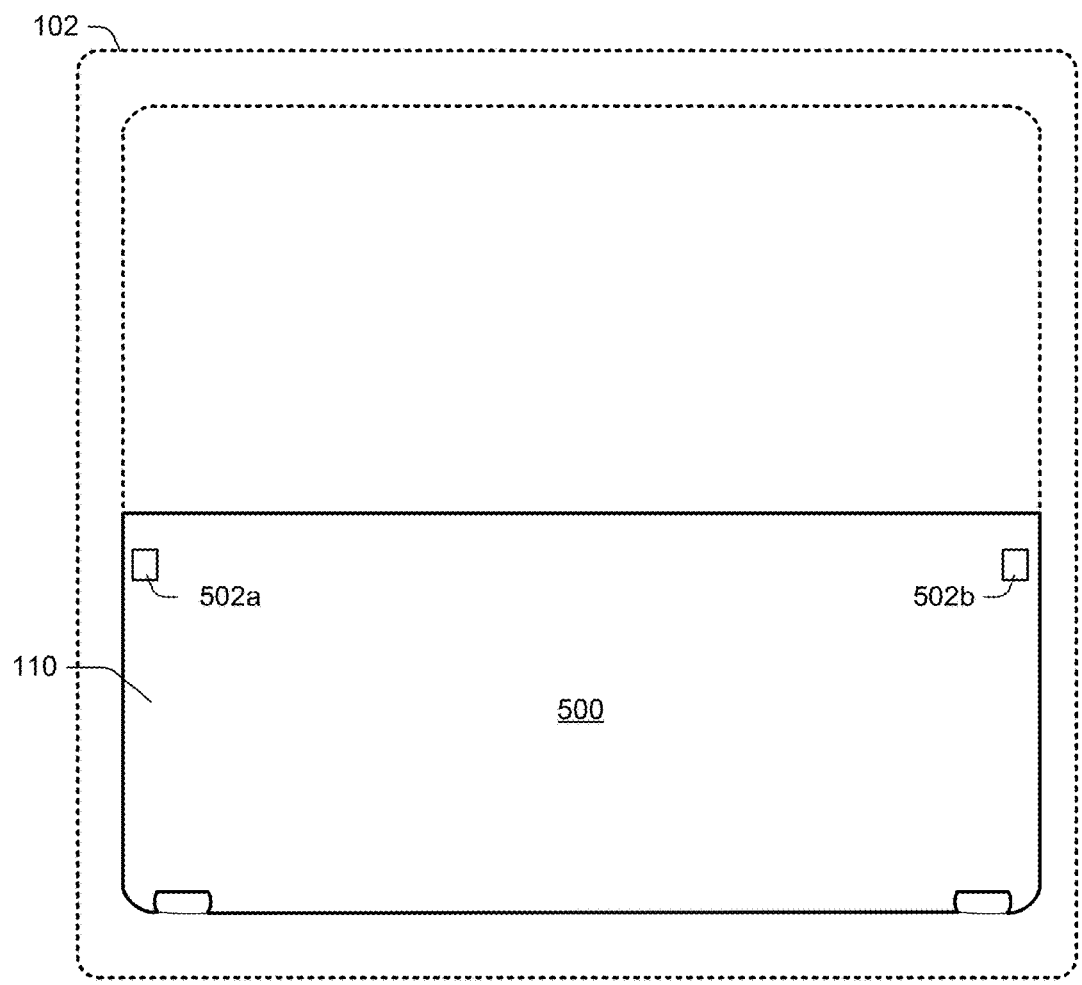
FIG. 5 depicts an example inner surface of a support component in accordance with one or more examples.

FIG. 5 depicts a view of an inner surface 500 of the support component 110 in accordance with one or more examples. In this example, the support component 110 is illustrated in the context of an outline of a chassis of the computing device 102. The inner surface 500 includes hinge mounts 502a, 502b, which function as mounting points for hinge mechanisms that are employed to attach the support component 110 to the computing device 102. Examples of such hinge mechanisms are discussed below.

A variety of different hinge mechanisms may be employed for attaching various components in accordance with various examples. Some example hinge mechanisms and hinge arrangements are discussed below.

Figure 6:
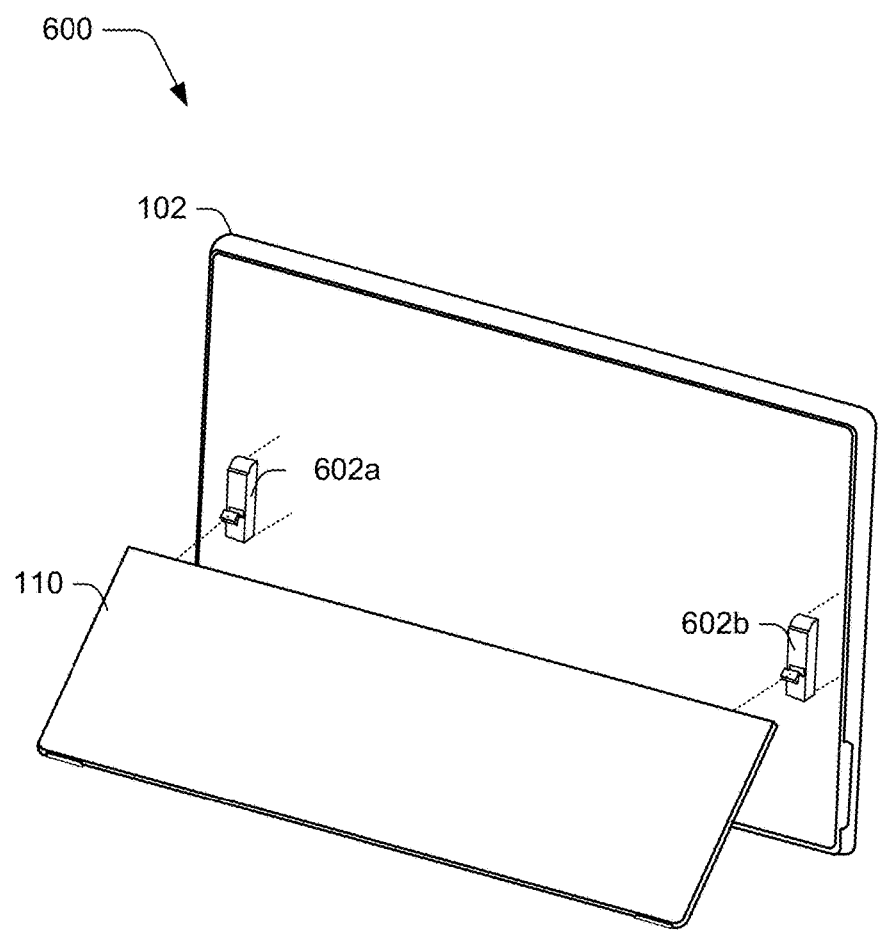
FIG. 6 depicts an example exploded view of a computing device with a support component in accordance with one or more examples.

FIG. 6 depicts an exploded rear view 600 of a chassis of the computing device 102 and the support component 110. Included in the rear view 600 are hinges 602a and 602b, which are employed to attach the support component 110 to the computing device 102. The hinges 602a, 602b are configured to be installed internally in the computing device 102, such as via a suitable attachment method and/or device. The hinges 602a, 602b, for instance, represent instances of the hinge 114 introduced with reference to FIG. 1.

The support component 110 may be attached to a pivoting portion of the hinges 602a, 602b via the hinge mounts 502a, 502b, discussed above with reference to FIG. 5. Thus, attachment to the hinges 602a, 602b enables the support component 110 to pivot between various positions with reference to the computing device 102.

Figure 7A:
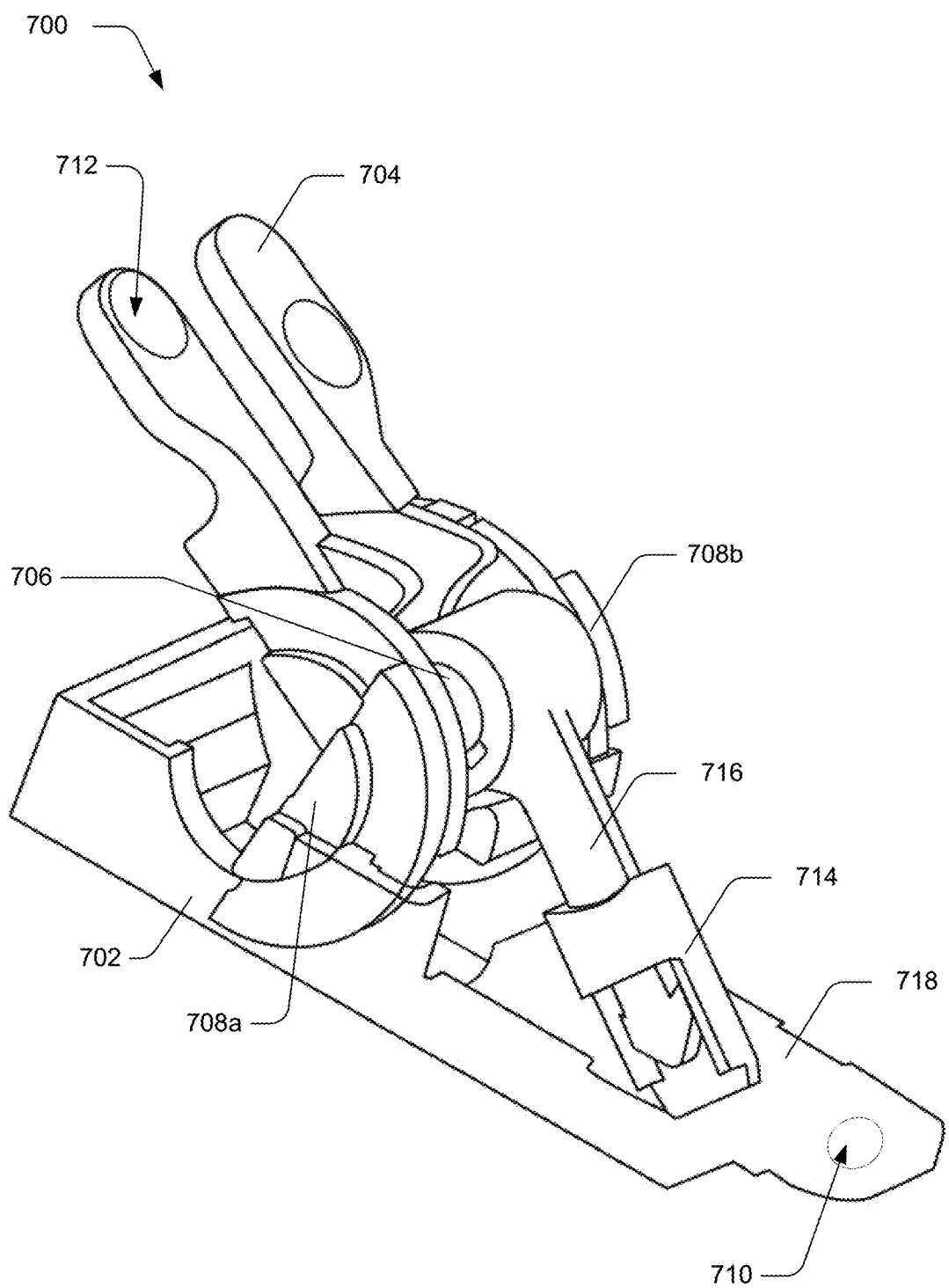
FIG. 7A depicts components of an example hinge mechanism in accordance with one or more examples.

FIG. 7A depicts components of an example hinge 700 in accordance with one or more examples. The hinge 700, for instance, may represent an implementation of the hinge 114 and/or the hinges 602a, 602b discussed above. This is not intended to be limiting, however, and the hinge 700 may be employed as a hinge mechanism for a variety of different components and in a variety of different attachment scenarios. The hinge 700 and its various components may be formed using any suitable material and/or combination of materials, such as metals, plastics, polymers, alloys, and so forth.

Components of the hinge 700 include a hinge frame 702 in which various other components of the hinge 700 may be disposed. For example, the hinge frame 702 may be mounted to and/or within a device (e.g., the computing device 102) and function as a support structure for other components of the hinge 700. The hinge frame 702 may include one or more screw holes 710 via which the hinge frame is mounted to a chassis or housing of the computing device 102 by one or more screws.

Further included in the hinge 700 are a cam 704, a cam follower 706, a support plate 708a, and an additional support plate 708b. The cam 704 may include one or more screw holes 712 via which the cam 704 is be mounted to the support component 110 by one or more screws.

Support plates 708a, 708b are positioned between the hinge frame 702 and the cam 704 such that a first surface of a support plate 708a is rotatably connected with the hinge frame 702 and a second, opposite surface of the support plate 708a is rotatably connected with the cam 704. The support plates 708a, 708b provide lateral support for the hinge 700 in various open positions and enable the hinge 700 to be positioned in various open positions.

As detailed elsewhere herein, interaction between the cam 704 and the cam follower 706 within the hinge 700 provides a particular responsiveness profile during user manipulation of a component attached to the hinge 700, e.g., the support component 110.

Certain components of the hinge 700 (e.g., the hinge frame 702, cam 704, cam follower 706, support plates 708a, 708b) may be rotatably connected with each other via guides positioned on the hinge components.

As used herein, a "guide" may refer to a protrusion (e.g., a ridge or rail) extending outward from a surface of the hinge component. Alternatively, a guide may refer to a channel (e.g., a groove or recess) subsiding inward from a surface of a hinge component. In certain examples, a protrusion guide from a first hinge component is paired or coupled with a channel guide of a second hinge component such that the protrusion guide is inserted into the channel guide. The first and second hinge components may be rotatably mounted via this guide pairing.

In some examples, an additional guide of the second hinge component may also be formed in the shape of a similar or different length arc or circle segment such that a guide of a third hinge component coupled with the additional guide of the second hinge component may be configured to rotate along an additional arc path. To the extent additional hinge components are present, the fourth hinge component may be coupled with the third hinge component in a similar manner, and so on.

In certain examples, surface elements may be positioned on any of these guides or components to reduce, minimize, or otherwise eliminate any free play or loose feeling between the rotatably or pivotally connected hinge components. Such surface elements are discussed in greater detail below with reference to FIGS. 9A-11C, for example.

As depicted in FIG. 7A, the hinge 700 also includes an anchor link 714 and a telescoping link 716. The anchor link 714 is pivotally connected with the hinge frame 702 at a first end. The anchor link 714 may include a rod or shaft positioned at or near the first end (depicted in FIG. 7C below). The rod is inserted into a cylindrical opening 718 of the hinge frame 702 about which the anchor link 714 rotates.

A first end of the telescoping link 716 is connected to or in communication with the cam 704 (via an intermediate hinge component). As depicted in FIG. 7A, the first end of the telescoping link 716 is pivotally connected to the cam follower 706, which is in turn connected with the cam 704. A second, opposite end of the telescoping link 716 is in communication with the second end of the anchor link 714. As depicted in FIG. 7A, the second end of the telescoping link 716 is inserted into an opening in the second end of the anchor link 714. The second end of the telescoping link 716 is configured to slide or move in the opening of the anchor link 714 between the first and second ends of the anchor link 714.

The interaction between the anchor link 714 and the telescoping link 716 is configured to provide a connection between the cam 704 with the hinge frame 702. This is advantageous in creating a particular responsiveness profile during user manipulation of a component attached to the hinge 700, (e.g., the support component 110). For example, friction or resistance between the anchor link 714 and telescoping link 716 may provide a torque response at the cam 804.

In certain examples, surface elements may be positioned on the surface of the anchor link 714 or the telescoping link 716 to reduce, minimize, or otherwise eliminate any free play or loose feeling between the connected hinge components. Such a surface element is discussed in greater detail below with reference to FIGS. 10C and 10D, for example.

Figure 7B:
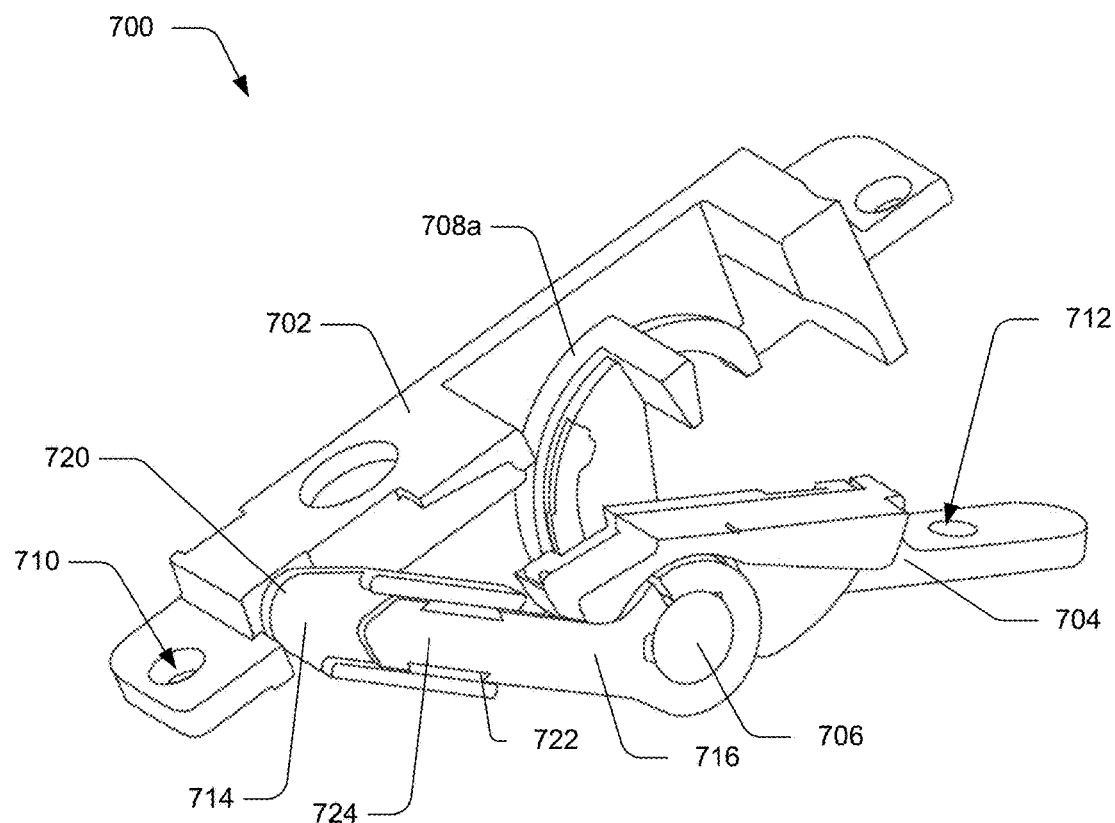
FIG. 7B depicts a cross-sectional view of the example hinge mechanism of FIG. 7A.

FIG. 7B depicts a cross-sectional view of the example hinge 700 of FIG. 7A. As shown in this cross-sectional view, the telescoping link 716 is positioned within an opening cavity of the anchor link 714. The telescoping link 716 is configured to slide or move in the opening of the anchor link 714 between the first end 720 and the second end 722 of the anchor link 714. The telescoping link 716 moves inward and outward of the opening in the anchor link 714 based on the rotational movement of cam 704 (and the support component 110 connected to the cam 704).

As depicted in FIG. 7B, a surface element 724 is positioned on the surface of the telescoping link 716. In alternative examples, one or more surface elements may be positioned on a surface of the anchor link 714.

Figure 7C:
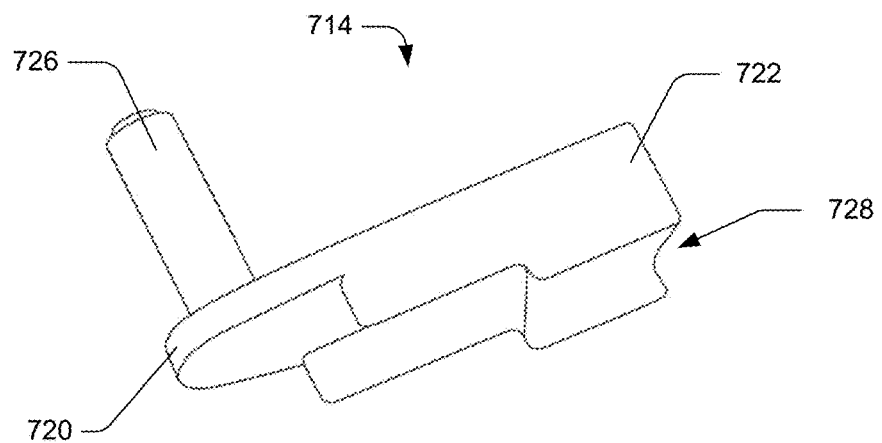
FIG. 7C depicts an example of the anchor link of FIGS. 7A and 7B.

FIG. 7C depicts an example of the anchor link 714 of FIGS. 7A and 7B. The anchor link 714 includes a rod or shaft 726 positioned at or near the first end 720 of the anchor link 714. The rod 726 is configured to be inserted into the cylindrical opening of the hinge frame 702 (depicted in FIG. 7A). The second end 722 of the anchor link 714 includes an opening 728 configured to receive one end of the telescoping link 716.

Figure 8:
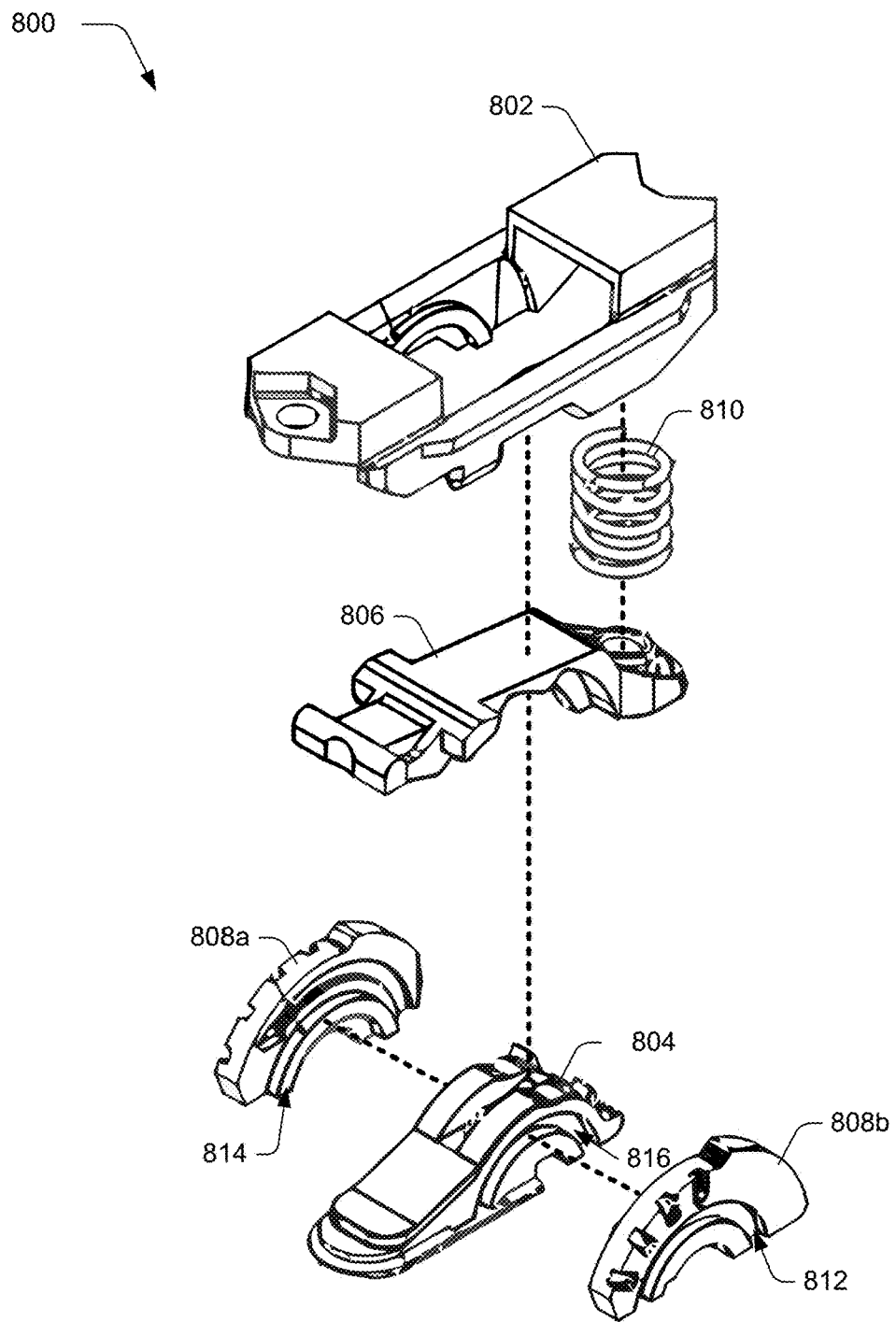
FIG. 8 depicts components of an additional example hinge mechanism in accordance with one or more examples.

FIG. 8 depicts components of an additional example hinge 800 in accordance with one or more examples. The hinge 800, for instance, may represent an implementation of the hinge 114 and/or the hinges 602a, 602b discussed above.

Components of the hinge 800 include a hinge frame 802 in which various other components of the hinge 800 may be disposed. For example, the hinge frame 802 may be mounted to and/or within a device (e.g., the computing device 102) and function as a support structure for other components of the hinge 800.

Further included are a cam 804, a cam follower 806, a support plate 808a, and an additional support plate 808b. As detailed elsewhere herein, interaction between the cam 804 and the cam follower 806 within the hinge 800 provides a particular responsiveness profile during user manipulation of a component attached to the hinge 800, e.g., the support component 110. Further, the support plates 808a, 808b provide lateral support for the hinge 800 in various open positions and enable the hinge 800 to be positioned in various open positions.

The hinge 800 also includes a hinge spring 810, which applies pressure to the cam follower 806 when the various components are placed in their respective positions within the hinge frame 802.

The components of the hinge 800 (e.g., the hinge frame 802, cam 804, cam follower 806, support plates 808a, 808b) may be rotatably connected with each other via guides positioned on the hinge components, such as described above in FIGS. 7A and 7B.

For example, a guide of the hinge frame 802 may be rotatably connected with a guide of the support plate 808a or 808b. For example, FIG. 8 depicts a channel guide 812 of the support plate 808b that may be rotatably connected with a protrusion guide of the hinge frame 802 (see, e.g., protrusion guides 1104a, 1104b of FIG. 11A discussed in greater detail below). Additionally, a separate guide of the support plate 808a or 808b may be rotatably connected with a guide of the cam 804. For example, FIG. 8 depicts a protrusion guide 814 of the support plate 808a that may be rotatably connected with a channel guide of the hinge frame 804 (not pictured). Additionally, a protrusion guide of the support plate 808b (not pictured) may be rotatably connected with a channel guide 816 of the hinge frame 804.

As noted above, surface elements may be positioned on any of these guides or components to reduce, minimize, or otherwise eliminate any free play or loose feeling between the rotatably or pivotally connected hinge components. Such surface elements are discussed in greater detail below with reference to FIGS. 9A-11C, for example.

Figure 9A:
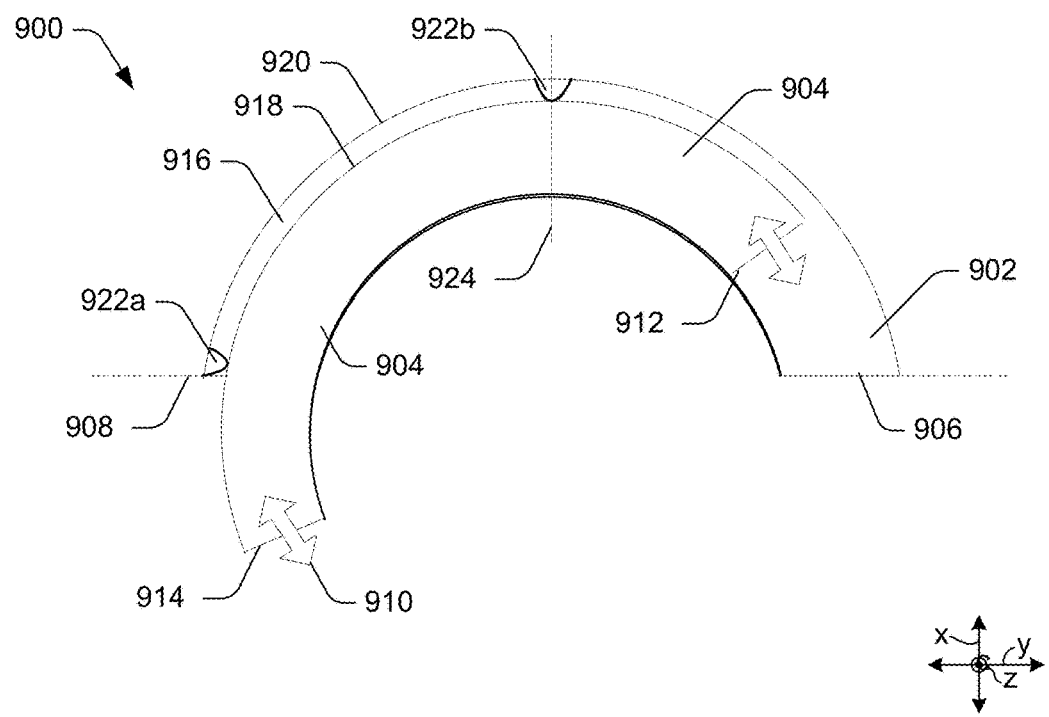
FIG. 9A depicts a channel guide of a first hinge component and a protrusion guide of a second hinge component in accordance with one or more examples.

FIG. 9A depicts an example of a channel guide 902 of a first hinge component (e.g., a hinge frame 802) and a protrusion guide 904 of a second hinge component (e.g., a support plate 808a). The channel guide 902 of a first hinge component may be in the shape of an arc or circle segment having a first end 906 and a second end 908. The protrusion guide 904 of a second hinge component coupled with the channel guide 902 of the first hinge component and is configured to rotate along an arc path 910 beginning at or near the first end 906 and extending outward from the second end 908 (e.g., within the x-y plane depicted in FIG. 9A).

In other words, the protrusion guide 904 has a first end 912 and a second end 914. In a closed configuration of the hinge, the first end 912 of the protrusion guide 904 is adjacent or near the first end 906 of the channel guide 902. Additionally, the second end 914 of the protrusion guide 904 is adjacent or near the first end 908 of the channel guide 902.

In one or more open configurations of the hinge (such as depicted in FIG. 9A), the first end 912 of the protrusion guide 904 is positioned at a distance farther away from the first end 906 of the channel guide 902 than in the closed configuration. Additionally, the second end 914 of the protrusion guide 904 is positioned at a distance farther away from the second end 908 of the channel guide 902 than in the closed configuration.

As mentioned above, the guide of the first hinge component may require clearance with the guide of the second hinge component to allow the components to translate between each other. The clearance must be large enough to work over the range of tolerance of the manufactured parts. In other words, due to manufacturing tolerances, there may be a gap 916 between the channel guide 902 of a first hinge component and the protrusion guide 904 of the second hinge component coupled with the first hinge component. The gap 916 is measured between a surface 918 of the protrusion guide and the adjacent surface 920 of the channel guide perpendicular to the direction of rotation of the guides 902, 904.

This gap 916 between the connected guides 902, 904 may result in the loose feeling or free play between the two hinge components. Therefore, in order to minimize or eliminate free play while still allowing the components of the hinge to move or rotate as intended (e.g., without undesired resistance or friction), one or more surface elements 922a, 922b may be added to at least one of the hinge components. For example, a surface element 922a, 922b may be added to a guide of a hinge component to reduce or eliminate the gap 916 between the channel guide 902 and the connected protrusion guide 904 of an additional hinge component. In some examples, the surface element refers to a plurality of surface elements.

In some examples, the addition of the surface element to a guide of a hinge component provides a form fit at the location of the surface element. A "form fit" may refer to an arrangement wherein no gap or space is present between the two components (e.g., the guide of a first hinge component coupled with the guide of a second hinge component) at the location of the surface element in at least one configuration of the first and second hinge components. Additionally, the form fit may refer to an arrangement where no pressure or friction is exerted on the surface element by the opposing component (e.g., during movement of the hinge components) in at least one configuration. In some examples, a form fit may be present in a plurality of configurations throughout the rotation of the first hinge component about the second hinge component.

In other examples, the addition of the surface element to a guide of a hinge component provides an interference fit at the location of the surface element in at least one configuration of the first and second hinge components. An "interference fit" may refer to an arrangement wherein no gap or space is present between the two components at the location of the surface element in the at least one configuration, and pressure or friction is exerted on the surface element by the opposing component (e.g., during movement of the hinge components). In some examples, an interference fit may be present in multiple configurations throughout the rotation of the first hinge component about the second hinge component.

In some arrangements, a hinge may be manufactured with a surface element on a guide of a hinge component that initially provides an interference fit, but may be revised to provide a form fit arrangement over time. For instance, the surface element may be worn down over time through repeated rotation of the hinge components due to the initial pressure or friction exerted on the surface element. In other words, the initial height or thickness of the surface element may provide an interference fit that is reduced over time by friction, eventually resulting in a form fit. This repeated rotation of the hinge components to reduce the height of the surface element may be performed by the manufacturer during assembly of the computing device or hinge device such that an end-user of the computing device does not experience a hinge device having an interference fit.

In certain examples, the addition of the surface element to a guide of a hinge component provides a reduced gap or space between the two components (e.g., the guide of a first hinge component coupled with the guide of a second hinge component) at the location of the surface element in at least one configuration of the first and second hinge components. In other words, the surface element does not provide a form fit or an interference fit in the at least one configuration, but still reduces or minimizes the amount of free play between the two hinge components based on a reduction in the gap or space between the two hinge components. In such an example, the surface element is designed not to touch or abut the opposing hinge component throughout the rotation of one hinge component about the second hinge component. In other examples, the surface element may be designed to touch or abut the opposing hinge component in certain configurations, but, due to the manufacturing tolerances of the components, the surface element does not touch or abut the opposing hinge component in other configurations in the rotation of one hinge component about the second hinge component.

The gap or distance between the two hinge components at the location of the surface element (as measured in a direction perpendicular with a direction of rotation of one hinge component about the second hinge component), may be 500 micrometers or less, 100 micrometers or less, 50 micrometers or less, 10 micrometers or less, 5 micrometers or less, or 1 micrometer or less. The gap or distance may be variable through the rotation of one hinge component about the second hinge component.

In some examples, the surface element may provide a form fit at the location of the surface element in one configuration of the first and second hinge components (e.g., an open configuration), and an interference fit at the location of the surface element in a second configuration of the first and second hinge components (e.g., a closed configuration). In other examples, the surface element may provide a form fit at the location of the surface element in one configuration of the first and second hinge components, and a reduced gap arrangement at the location of the surface element in a second configuration of the first and second hinge components. In yet other examples, the surface element may provide an interference fit at the location of the surface element in one configuration of the first and second hinge components, and a reduced gap arrangement at the location of the surface element in a second configuration of the first and second hinge components. Finally, in certain examples, the surface element may provide a form fit at the location of the surface element in one configuration of the first and second hinge components, a reduced gap arrangement at the location of the surface element in a second configuration of the first and second hinge components, and an interference fit at the location of the surface element in a third configuration of the first and second hinge components.

As depicted in FIG. 9A, two surface elements 922a, 922b are positioned on a surface of the channel guide 902. Additionally, or alternatively, one or more surface elements may be positioned on the opposing surface of the channel guide 902. Additionally, or alternatively, one or more surface elements may be positioned on a surface of the protrusion guide 904. In some examples, surface elements may be positioned on both the channel guide 902 and the protrusion guide 904.

In certain examples, such as depicted in FIG. 9A, the surface element 922a, 922b is a raised bump. In some examples, the surface element 922a, 922b is a plurality of raised bumps positioned on the surface of the guide. The bump or plurality of bumps may be formed in any shape. In one example, at least one bump is in a shape of a partial sphere (e.g., a half-sphere).

The surface element 922a, 922b may be formed from a same material as the guide on which it is positioned. In some examples, this is achieved during the manufacturing of the hinge component itself. For example, a diecast or injection mold for the hinge component may be designed to have one or more surface elements 922a, 922b (e.g., bumps) designed within the diecast or injection mold.

In alternative examples, the surface element 922a, 922b is added directly or indirectly to a surface of the guide. In such examples, the surface element 922a, 922b may be a same or different material as the guide on which it is positioned.

In some examples, the surface element is a polymer composition. The polymer composition may be a thermoplastic polymer. Thermoplastic polymers include acrylics such as polymethyl methacrylate (PMMA), acrylonitrile butadiene styrene (ABS), polyamides such as nylon, aliphatic polyesters such as polyactic acid (PLA), polybenzimidazole, polycarbonates, polyether sulfone (PES), polyether ether ketone (PEEK), polyetherimide (PEI), polyethylene (PE), polyphenylene oxide (PPO), polypheylene sulfide (PPS), polypropylene, polystyrene, polyvinyl chloride, or fluoropolymers such as polytetrafluoroethylene (PTFE). In one particular example, the thermoplastic polymer composition includes polyoxymethylene.

The surface element may be made of a composition that provides a low coefficient of friction when the surface element interacts with a composition on the surface of the abutting guide. The coefficient of friction (CoF) is a dimensionless scalar value which describes the ratio of the force of friction between two bodies and the force pressing them together. The coefficient of friction depends on the materials used. Having a low coefficient of friction between the surface element and abutting guide may be advantageous in that such an interaction provides a low resistance to the sliding or rotating motion between the connected hinge components. In some examples, the kinetic or dynamic coefficient of friction between the surface element and the abutting guide is 0.3 or less, 0.2 or less, or 0.1 or less.

In some examples, the surface element may be a metal composition configured to coat at least part of a surface of the hinge component (e.g., at least part of a surface of a guide of the hinge component). The metal composition may be a relatively soft metal (e.g., a composition having a Mohs hardness of 4 or less, 3 or less, or 2 or less). Such metal coating compositions may be advantageous as the surface of the metal composition may be configured to wear away after repeated use. For instance, the metal coating surface element may be manufactured with an initial thickness or height of the surface element. Due to the softness of the metal coating composition, the height of the surface element may be worn down over time through repeated rotation of the hinge components due to the initial pressure or friction exerted on the surface element by the opposing, connected hinge component. In other words, the initial height or thickness of the metal coating may be reduced over time by friction, resulting in a reduced thickness or height of the coating, and thus a revised interaction between the two hinge components. This repeated rotation of the hinge components to reduce the height of the surface element may be performed by the manufacturer during assembly of the computing device or hinge device such that an end-user of the computing device does not experience a hinge device having an undesired interaction.

Examples of such soft metal compositions having a Mohs hardness of 4 or less include metal compounds such cesium, rubidium, potassium, sodium, lithium, barium, calcium, lead, tin, cadmium, gold, silver, copper, and platinum. In one particular example, the metal coating composition includes copper.

The location or positioning of the at least one surface element is configurable. In certain examples, a surface element 922a may be positioned at an end of a channel guide (e.g., the second end 908 of channel guide 902), such that a portion of the protrusion guide 904 is configured to be adjacent to or abut the surface element 922a in any opened or closed configuration of the hinge. That is, a portion of the protrusion guide 904 is configured to be adjacent to or abut the surface element 922a throughout the rotation path 910 of the protrusion guide 904 within the channel guide 902.

Alternatively, a surface element may be positioned at an end of a protrusion guide (e.g., the first end 912 of protrusion guide 904), such that a portion of the channel guide 902 is configured to be adjacent to or abut the surface element in any opened or closed configuration of the hinge. That is, a portion of the channel guide 902 is configured to be adjacent to or abut the surface element throughout the rotation path 910 of the protrusion guide 904 within the channel guide 902.

Figure 9B:
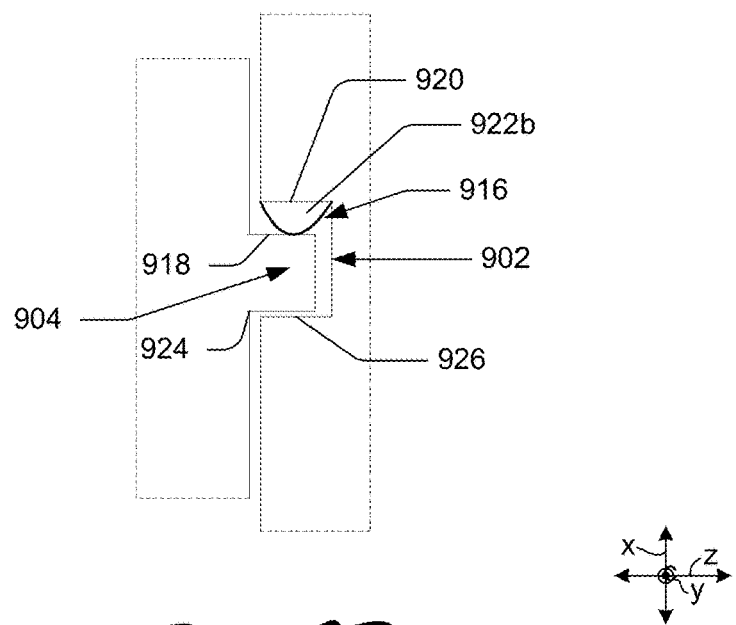
FIG. 9B depicts a cross-sectional view of the channel guide of the first hinge component and the protrusion guide of the second hinge component of FIG. 9A.

FIG. 9B depicts a cross-sectional view of the paired guides of the first and second hinge component of FIG. 9A as identified by the dashed-line 924 in FIG. 9A. FIG. 9B depicts a channel guide 902 of a first hinge component (e.g., hinge frame 802), and a protrusion guide 904 of a second hinge component (e.g., support plate 808b) positioned within the area of the channel. A gap 916 is present between the channel guide 902 of a first hinge component and the protrusion guide 904 of the second hinge component. The gap 916 is measured (in the x-direction) between a surface 918 of the protrusion guide 904 and the adjacent surface 920 of the channel guide 902 perpendicular to the direction of rotation (in the y-direction) of the guides 902, 904. A surface element 922b (e.g., a bump) is provided on the surface 920 of the channel guide 904 to minimize or eliminate any free play or loose feeling between the two hinge components. As noted above, while FIG. 9B depicts a surface element positioned on the channel guide 902, the surface element may alternatively be positioned on the surface 918 of the protrusion guide 904. Alternatively, the surface element may be positioned on the opposite surface 924 of the protrusion guide 904, or the opposite surface 926 of the channel guide 902, or any combination of surfaces thereof.

In an alternative example, the surface element is not a bump or plurality of bumps. Instead, the surface element is a layer of material that is molded over at least a portion of the surface of the guide (herein "an overmold"). Similar to the surface elements described above, the overmold surface element may be configured to provide a form fit, interference fit, a reduction in a gap, or a combination thereof between adjacent hinge components at the location of the surface element throughout the rotation of one hinge component about the second hinge component.

Figure 10A:
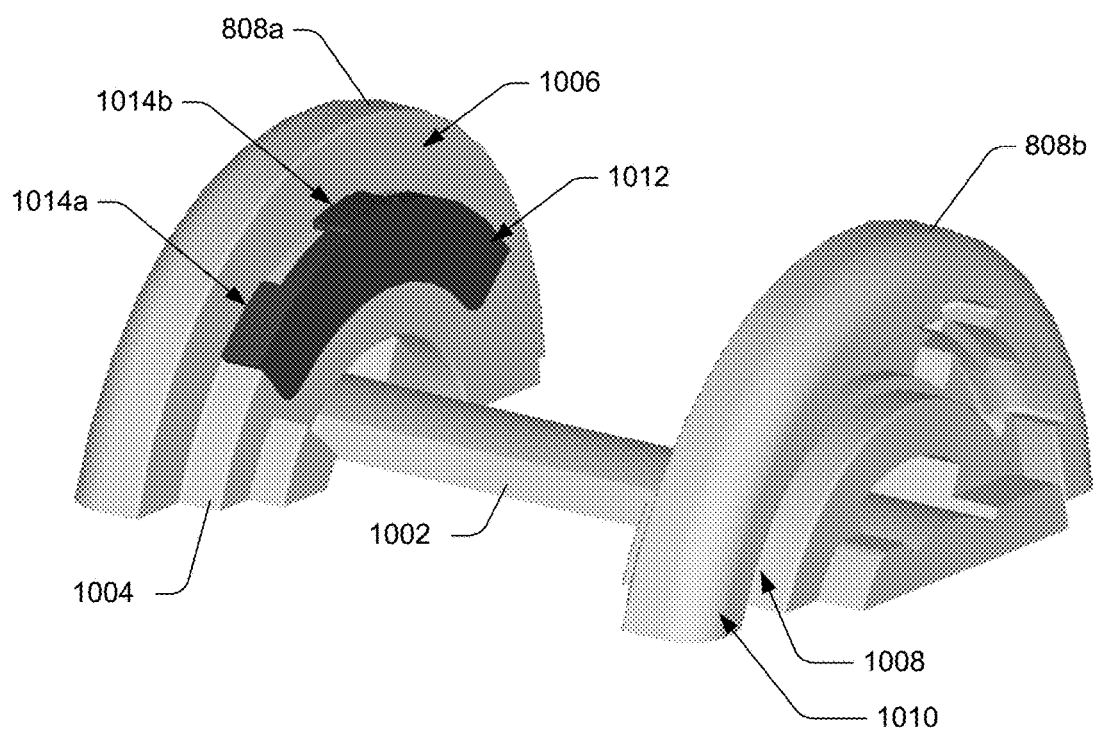
FIG. 10A depicts a surface element molded over a surface of a hinge component in accordance with one or more examples.

FIG. 10A depicts an example of an overmold surface element positioned on a surface of a hinge component. Specifically, FIG. 10A depicts a first support plate 808a connected with a second support plate 808b by a link 1002. The first support plate 808a includes a protrusion guide 1004 positioned on an inner surface 1006 of the first support plate 808a. While not depicted, the inner surface of the second support plate 808b may also include a protrusion guide. The protrusion guide 1004 and additional protrusion guide of the support plates 808a, 808b may be rotatably connected with channel guides of an additional hinge component (e.g., a cam 804).

The second support plate 808b includes a channel guide 1008 positioned on an outer surface 1010 of the second support plate 808b. While not depicted, an outer surface of the first support plate 808a may also include a channel guide. The channel guide 1008 and additional channel guide of the support plates 808a, 808b may be rotatably connected with protrusion guides of an additional hinge component (e.g., a hinge frame 802).

As depicted in FIG. 10A, a surface element 1012 is provided on a portion of a surface of the protrusion guide 1004 of the first support plate 808a. The surface element 1012 is a layer of material that is molded over the surface of the protrusion guide 1004.

The overmold may be configured to having varying thicknesses or heights such that the overmold surface element only touches or abuts an opposing surface of a hinge component in specific locations. This may be advantageous in providing a targeted resistance or interference between hinge components at certain locations (e.g., like the plurality of bumps described above) without overly restricting the rotational movement of one hinge component about the second hinge component.

For example, the overmold surface element 1012 includes a base material and two raised areas 1014a, 1014b extending above the base material. These extended ridges or raised areas 1014a, 1014b may be configured to touch or abut the opposing surface of the channel guide coupled with the first support plate 808a. Fewer or additional extended ridges or areas may be provided.

The overmold surface element 1012 may be applied to the hinge component following the manufacture of the hinge component (e.g., by heating and molding the overmold surface element material to the guide of the hinge component). The overmold may be held in place on the surface of the guide based on the design or structure of the overmold. Alternatively, the overmold surface element 1012 may adhere to the surface of the guide based on the composition of the surface element and the composition of the guide. In some examples, an intermediate adhesion layer may be positioned between the overmold surface element and the guide to indirectly adhere the surface element to the guide. The adhesion layer may be any known or later developed composition. In certain examples, the adhesive layer may include one or more pressure-sensitive adhesive materials. Additional or alternative types of adhesive materials and films may be used, including, for instance, moisture or thermally cured adhesive materials. The adhesive materials of the adhesive layers may be silicone-based, epoxy-based and/or acrylic-based materials.

The overmold surface element 1012 may be a same or different material as the guide on which it is positioned. In some examples, the overmold is a polymer composition, such as one or more of the polymers described above. In one particular example, the overmold is a thermoplastic polymer composition (e.g., including polyoxymethylene). As mentioned above, the overmold may be made of a composition that provides a low coefficient of friction when combined with the composition of the abutting guide (e.g., a coefficient of 0.3 or less, 0.2 or less, or 0.1 or less).

Figure 10B:
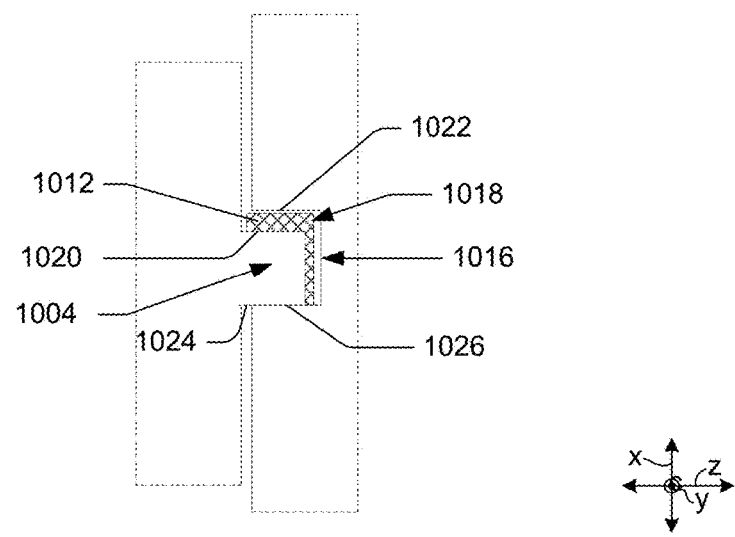
FIG. 10B depicts a cross-sectional view of a protrusion guide of a first hinge component positioned within a channel guide of a second hinge component in accordance with one or more examples.

FIG. 10B depicts a cross-sectional view of a protrusion guide 1004 of a first hinge component (e.g., the first support plate 808*a* in FIG. 10A) positioned within a channel guide 1016 of a second hinge component (e.g., a cam 804). A gap 1018 is present between the channel guide 1016 and the protrusion guide 1004. The gap 1018 is measured (in the x-direction) between a surface 1020 of the protrusion guide 1004 and the adjacent surface 1022 of the channel guide 1016 perpendicular to the direction of rotation of the guides (in the y-direction). An overmold surface element 1012 is provided on the surface 1020 of the protrusion guide 1004 to minimize or eliminate any free play or loose feeling between the two hinge components. As noted above, while FIG. 10B depicts a surface element positioned on the protrusion guide 1004, the surface element may alternatively be positioned on the surface 1022 of the channel guide 1016. Alternatively, the surface element may be positioned on the opposite surface 1024 of the protrusion guide 1004, or the opposite surface 1026 of the channel guide 1016, or any combination of surfaces thereof.

Figure 10C:
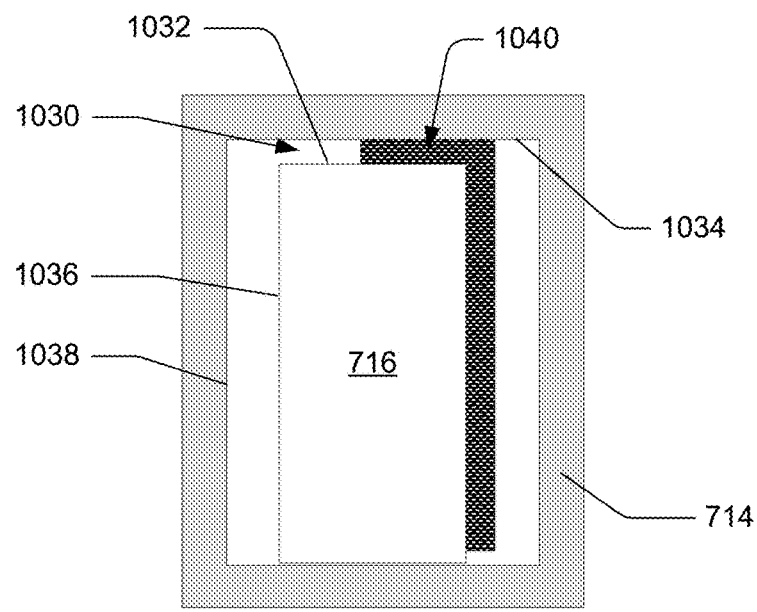
FIG. 10C depicts an example of a cross-sectional view of a connected anchor link and telescoping link.
Figure 10C:
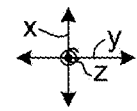

FIG. 10C depicts an example of the cross-sectional view of the connected anchor link 714 and telescoping link 716 discussed above in FIGS. 7A and 7B. A gap 1030 is present between the anchor link 714 and the telescoping link 716. The gap 1030 may be measured in the x-direction between a surface 1032 of the telescoping link 716 and the adjacent surface 1034 of the anchor link 714. Alternatively, the gap may be measured in the y-direction between a surface 1036 of the telescoping link 716 and the adjacent surface 1038 of the anchor link 714.

A surface element 1040 is provided on the surface 1032 of the telescoping link 716 to minimize or eliminate any free play or loose feeling between the two hinge components. In this example, the surface element 1040 is an overmold surface element such as discussed above in FIGS. 10A and 10B). Similar to the surface elements described above, the overmold surface element 1040 may be configured to provide a form fit, interference fit, a reduction in the gap, or a combination thereof between the telescoping link 716 and the anchor link 714 at the location of the surface element 1040 throughout the sliding movement of the telescoping link 716 within the anchor link 714. In one particular example, the overmold surface element 1040 provides an interference fit to provide friction or resistance in the movement of the telescoping link 716 within the anchor link 714.

While FIG. 10C depicts the overmold surface element 1040 positioned on the telescoping link 716, the surface element may alternatively be positioned on the surface 1034 of the anchor link 714. Alternatively, the surface element may be positioned on any other external surface of the telescoping link 716 (e.g., surface 1036), or any other internal surface of the anchor link 714 (e.g., surface 1038), or any combination of surfaces thereof to provide the form fit, interference fit, or reduction in the gap between the two components.

Figure 10D:
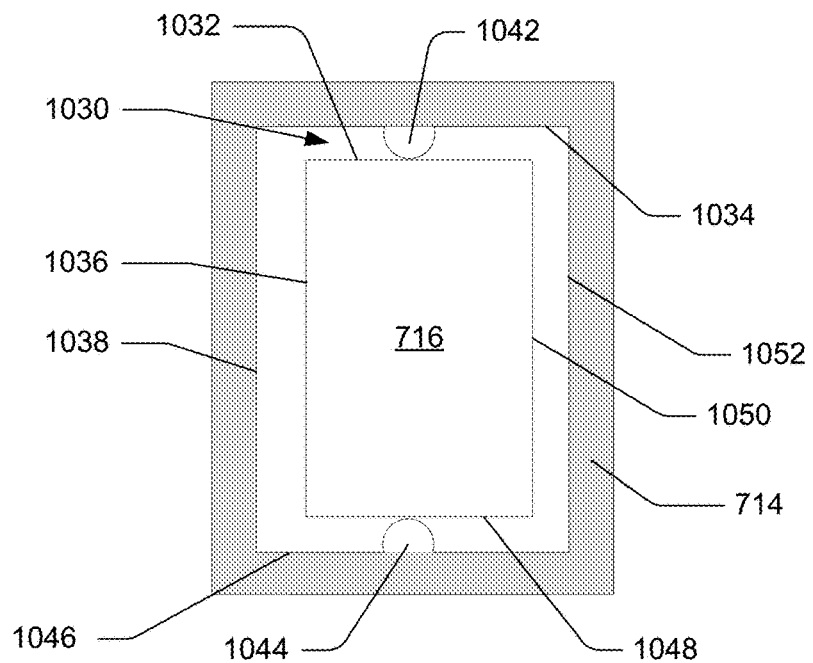
FIG. 10D depicts an alternative example of a cross-sectional view of a connected anchor link and telescoping link.
Figure 10D:
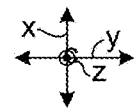

FIG. 10D depicts an alternative example of the cross-sectional view of the connected anchor link 714 and telescoping link 716 discussed above in FIGS. 7A and 7B. A gap 1030 is present between the anchor link 714 and the telescoping link 716. The gap 1030 may be measured in the x-direction between a surface 1032 of the telescoping link 716 and the adjacent surface 1034 of the anchor link 714. Alternatively, the gap may be measured in the y-direction between a surface 1036 of the telescoping link 716 and the adjacent surface 1038 of the anchor link 714.

A surface element 1042 is provided on the surface 1034 of the anchor link 714 to minimize or eliminate any free play or loose feeling between the two hinge components. An additional surface element 1044 is provided on an opposite surface 1046 of the anchor link 714 to assist in minimizing or eliminating free play. In this example, the surface element 1042 is a raised bump (such as discussed above in FIGS. 9A and 9B). Similar to the surface elements described above, the raised bump 1042 may be configured to provide a form fit, interference fit, a reduction in the gap, or a combination thereof between the telescoping link 716 and the anchor link 714 at the location of the surface element 1042, 1044 throughout the sliding movement of the telescoping link 716 within the anchor link 714. In one particular example, the surface element 1042, 1044 provides an interference fit to provide friction or resistance in the movement of the telescoping link 716 within the anchor link 714.

While FIG. 10D depicts the surface elements 1042, 1044 positioned on the anchor link 714, the surface element may be positioned on any external surface of the telescoping link 716 (e.g., surface 1030, 1036, 1048, or 1050), or any other internal surface of the anchor link 714 (e.g., surface 1038 or 1052), or any combination of surfaces thereof to provide the form fit, interference fit, or reduction in the gap between the two components.

Figure 11A:
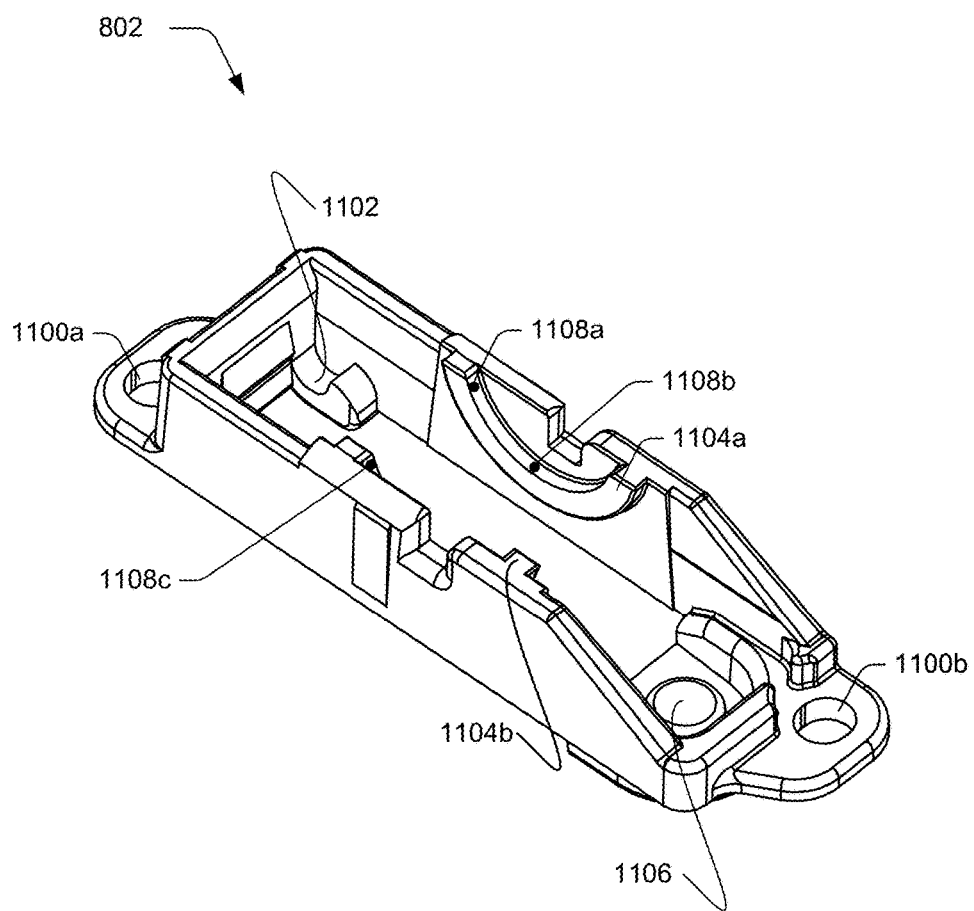
FIG. 11A depicts a detail of portions of a hinge frame in accordance with one or more examples.

FIG. 11A depicts a detail of portions of the hinge frame 802. The view of the hinge frame 802 presented in FIG. 8 is rotated 180 degrees relative to the view illustrated in FIG. 11A. The hinge frame 802 includes hinge mounts 1100*a* and 1100*b* by which the hinge frame 802, and thus the hinge 800, may be mounted to an apparatus (e.g., computing device). For instance, the hinge mounts 1100*a*, 1100*b* represent apertures through which a fastening mechanism such as a screw or bolt may be positioned and fastened into an apparatus, such as the computing device 102.

The hinge frame 802 further includes a cam follower mount 1102 into which the cam follower 806 may be mounted. While not expressly illustrated here, the cam follower mount 1102 includes a similar portion on the opposite inside surface of the hinge frame 802, thus forming a cradle into which a mounting portion of the cam follower 806 may be attached.

Guides 1104*a*, 1104*b* represent raised or protruding portions on the inside surface of the hinge frame 802 which are employed for mounting the support plates 808*a*, 808*b* into the hinge frame 802. For instance, the guides 1104*a*, 1104*b* represent raised or protruding portions (e.g., curved rails) that are mirror images of one another on opposite inside surfaces of the hinge frame 802. The support plates 808*a*, 808*b* may include channel guides to engage with the protruding guides 1104*a*, 1104*b* to hold the support plates 808*a*, 808*b* within the hinge frame 802. During movement of a component attached to the hinge 800 between one or more open positions, the protruding guides 1104*a*, 1104*b* cause rotational movement of the support plates 808*a*, 808*b* relative to the hinge frame 802. As further illustrated herein, rotational movement of the support plates 808*a*, 808*b* enables an attached component to be positioned in various different positions.

Additionally, the guides 1104*a*, 1104*b* may include at least one surface element 1108*a*, 1108*b*, 1108*c* positioned on a surface of the guide 1104*a*, 1104*b* to reduce or eliminate any free play between the hinge frame 802 and the rotatably connected support plates 808*a*, 808*b*.

The hinge frame 802 further includes a spring mount 1106, which represents a surface onto which the hinge spring 810 is placed. Placement of the hinge spring 810 onto the spring mount 1106 may enable the hinge spring 810 to exert pressure upon the cam follower 806. Spring pressure on the cam follower 806 holds the cam follower against the cam 804 and thus enables the cam 804 to be held in various preset positions.

Figure 11B:
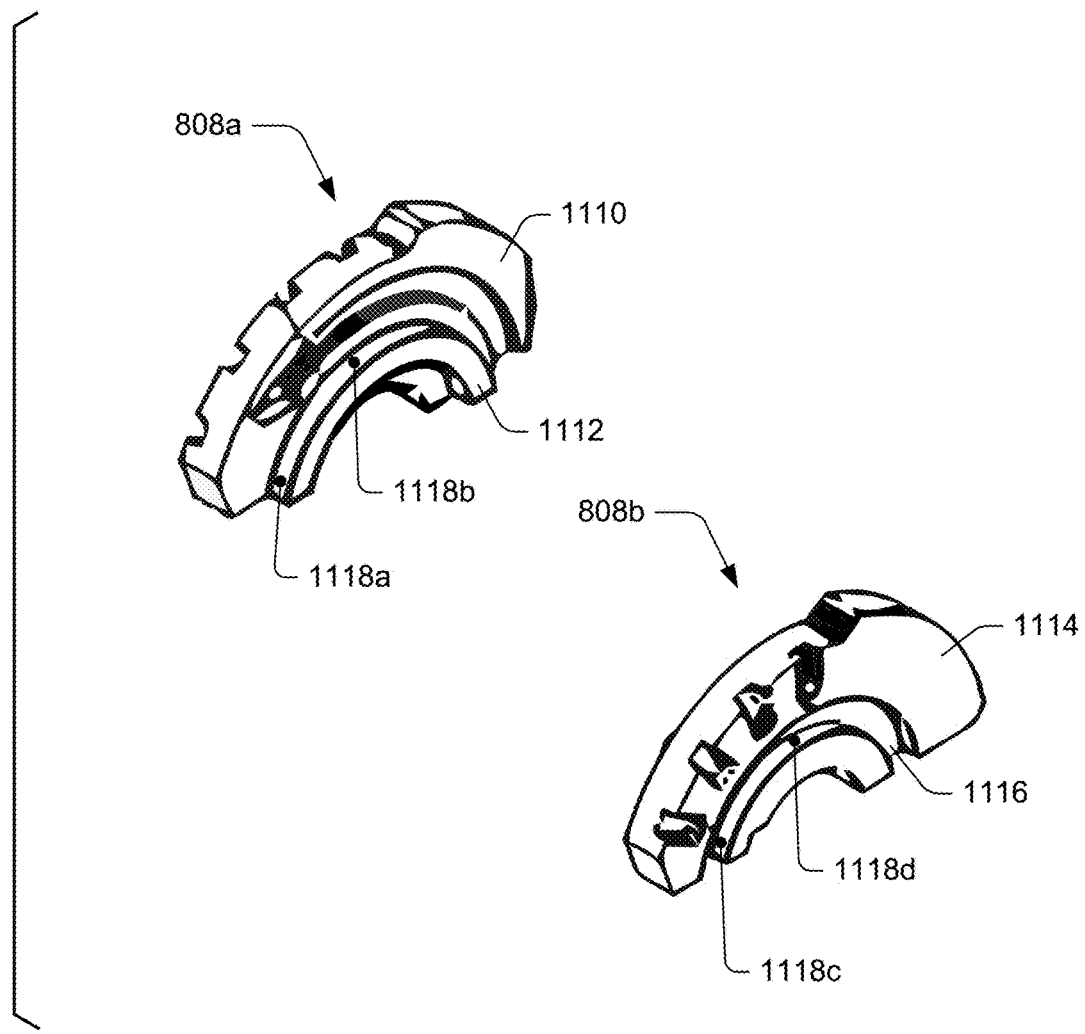
FIG. 11B depicts a detail of portions of example support plates in accordance with one or more examples.

FIG. 11B depicts a detail of portions of the support plates 808*a*, 808*b*. Illustrated as part of an inner support surface 1110 of the support plate 808*a* is a support plate guide 1112. Although not illustrated here, the support plate 808*b* similarly includes a respective support plate on its inner surface. The support plate guides 1112 may protrude from the surfaces of the respective support plates 808*a*, 808*b* and engage with a channel guide of the cam 804 to moveably attach the cam 804 to the hinge 800. During movement of a component attached to the cam 804, the support plate protrusion guides 1112 enable rotational movement of the cam 804 relative to the support plates 808*a*, 808*b* and the hinge frame 802. As further illustrated herein, rotational movement of the cam 804 enables an attached component to be placed in various positions.

Additionally, the support plate protrusion guides 1112 may include at least one surface element 1118*a*, 1118*b* positioned on a surface of the protrusion guide 1112 to reduce or eliminate any free play between the support plate 808*a*, 808*b* and the rotatably connected cam 804.

An outer surface 1114 of the support plate 808*b* includes a guide or support channel 1116 that engages with the plate guide 1104*b* of the hinge frame 802, introduced above. For instance, the dimensions of the support channel guide 1116 are such that the protrusion guide 1104*b* fits within the support channel guide 1116 when the support plate 808*b* is mounted within the hinge frame 802. During movement of the support plate 808*b* relative to the hinge frame 802, the support channel guide 1116 slides relative to the protrusion guide 1104*b* to enable rotational movement of the support plate 808*b* relative to the hinge frame 802. Although not illustrated here, an outer surface of the support plate 808*a* similarly includes a respective support channel or guide that engages with the protrusion guide 1104*a* of the hinge frame 802. Further features of the support plates 808*a*, 808*b* are discussed below.

Additionally, the support channel guides 1116 may include at least one surface element 1118*c*, 1118*d* positioned on a surface of the guide 1116 to reduce or eliminate any free play between the support plate 808*a*, 808*b* and the rotatably connected hinge frame 802.

Figure 11C:
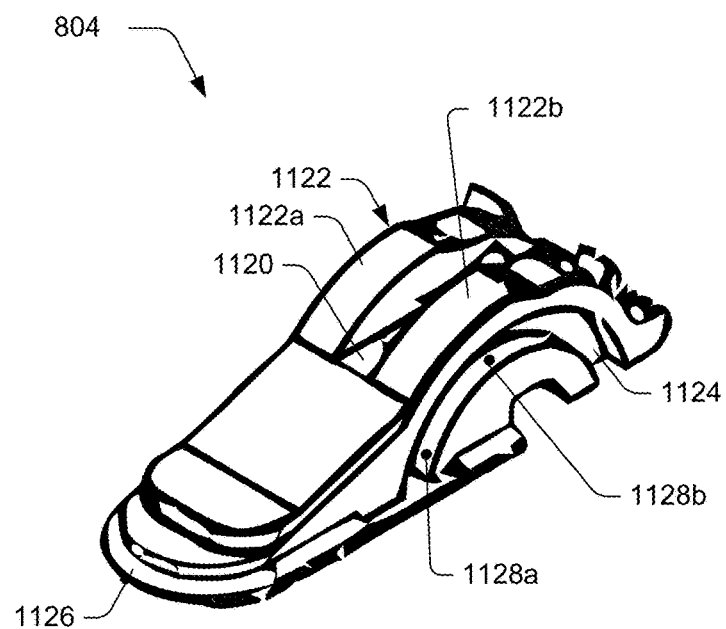
FIG. 11C depicts a detail of portions of a hinge cam in accordance with one or more examples.

FIG. 11C depicts example details of the cam 804. The cam 804 includes an inner cam surface 1120 and outer cam surfaces 1122*a*, 1122*b*. As illustrated, the inner cam surface 1120 is recessed in a channel along an inside portion of the cam 804. The inner cam surface 1120, for instance, is positioned along center lengthwise axis of the cam 804.

The cam 804 further includes a cam guide or channel 1124 and a component mounting portion 1126. The cam channel guide 1124 is formed such that when the cam 804 is mounted within the hinge frame 802 relative to the support plates 808*a*, 808*b*, the cam channel guide 1124 engages with the support plate protrusion guide 1112 of the support plate 808*a*. Although not illustrated here, the opposite side of the cam 804 includes a respective cam guide or channel. The dimensions of the support plate protrusion guide 1112 of the support plate 808*b*, for instance, are such that the support plate protrusion guide 1112 fits within the cam channel guide 1124. During movement of the cam 804 relative to the hinge frame 802, the cam channel guide 1124 slides relative to the support plate protrusion guide 1112 to enable rotational movement of the cam 804 relative to the support plates 808*a*, 808*b*.

Additionally, the cam channel guide 1124 may include at least one surface element 1128*a*, 1128*a* positioned on a surface of the guide 1124 to reduce or eliminate any free play between the cam 804 and the rotatably connected support plates 808*a*, 808*b*.

The component mounting surface 1126 is representative of a portion of the cam 804 to which a component (e.g., the support component 110) may be mounted. For instance, the component mounting surface 1126 includes surface attributes that engage and/or interlock with a component to stabilize the component relative to the cam 804. Alternatively, or additionally, the component mounting surface 1126 may include one or more apertures through which a fastening device such as a screw or bolt may be placed to fasten the hinge to a component.

Figure 12:
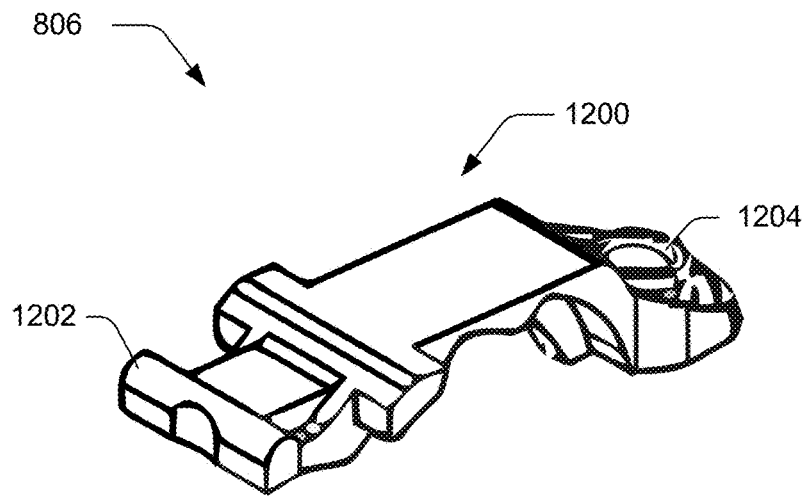
FIG. 12 depicts a detail of a top surface of a cam follower in accordance with one or more examples.

FIG. 12 depicts a detail of a top surface 1200 of the cam follower 806. The top surface 1200 includes a follower pivot 1202 which is formed to engage within the cam follower mount 1102 (introduced above) of the hinge frame 802. For instance, the follower pivot 1202 is fashioned such that the follower pivot slidably rotates within the cam follower mount 1102 during movement of various components of the hinge 800.

The top surface 1200 of the cam follower 806 further includes a spring platform 1204 which is configured to engage with the hinge spring 810. For example, spring tension from the hinge spring 810 against the spring platform 1204 holds the cam follower 806 against the cam 804. Thus, spring tension against the cam follower 806 results in a reaction at the cam 804 that provides a torque response at the cam 804. As discussed herein, the torque response results at least in part from the shape of the cam 804 and the cam follower 806, and the interaction between their respective surfaces.

For instance, depending on the angular position of the cam 804 and the direction of motion, movement of the cam 804 may be either resisted (e.g., opposed) or driven. This interaction between the different elements of the hinge 800 provides for a "snappy" response of an attached component, e.g., the support component 110.

Figure 13:
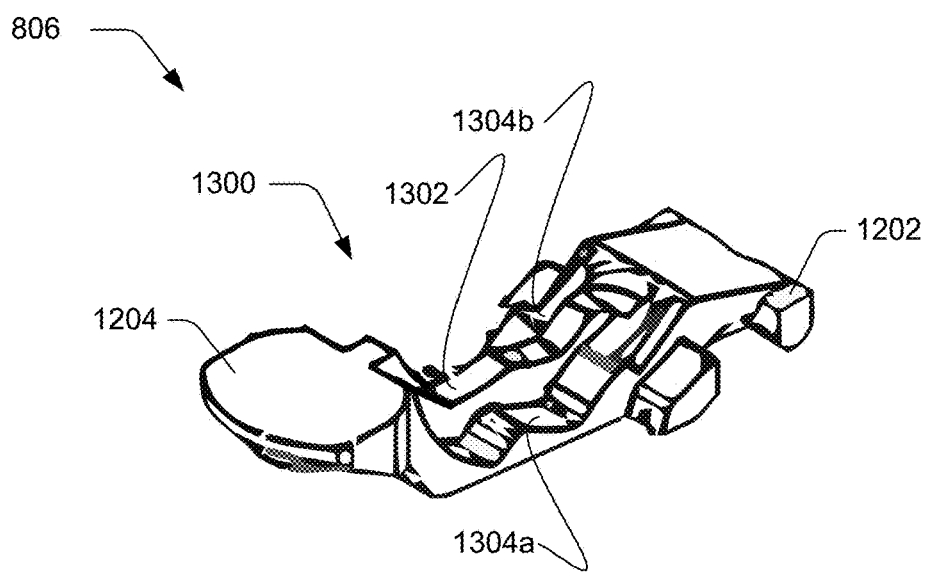
FIG. 13 depicts a detail of a bottom surface of a cam follower in accordance with one or more examples.

FIG. 13 depicts a detail of a bottom surface 1300 of the cam follower 806. The bottom surface 1300 includes lower portions of the follower pivot 1202 and the spring platform 1204, introduced above.

The bottom surface 1300 further includes an inner follower surface 1302 and outer follower surfaces 1304*a*, 1304*b*. For purpose of discussion, the outer follower surfaces 1304*a*, 1304*b* may be referred to as an outer follower surface 1304a. The inner follower surface 1302 protrudes from the bottom surface 1300 relative to the outer follower surfaces 1304a, 1304b. As detailed elsewhere herein, the inner follower surface 1302 and the outer follower surfaces 1304a, 1304b interact with surfaces of the cam 804 to provide a particular torque response for a component attached to the hinge 800.

Figure 14:
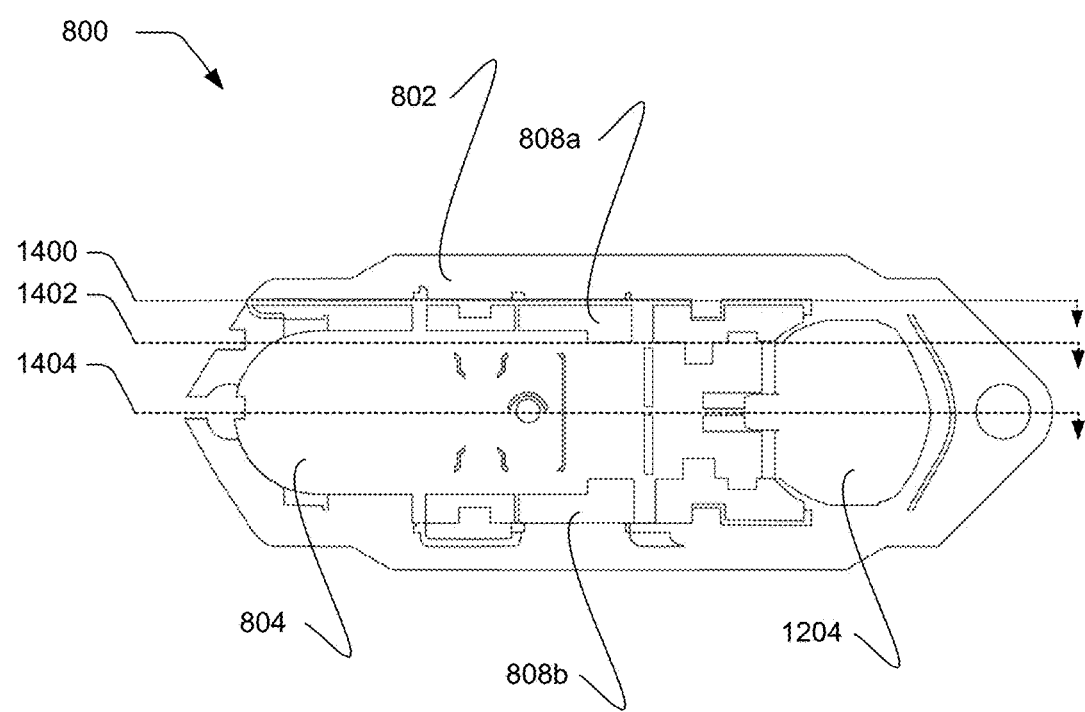
FIG. 14 depicts example cross-section regions of a hinge mechanism in accordance with one or more examples.

FIG. 14 depicts locations of vertical cross-sections of the hinge 800 which will be used to describe function and attributes of the hinge 800 in subsequent figures. Included are a first cross-section 1400, a second cross-section 1402, and a third cross-section 1404. These cross-sections may define respective planes through the hinge 800. Reference to these different cross-sections will be made in the subsequent discussion. Further illustrated are the hinge frame 802, the cam 804, the support plates 808a, 808b, and the bottom portion of the spring platform 1204 of the cam follower 806.

Figure 15:
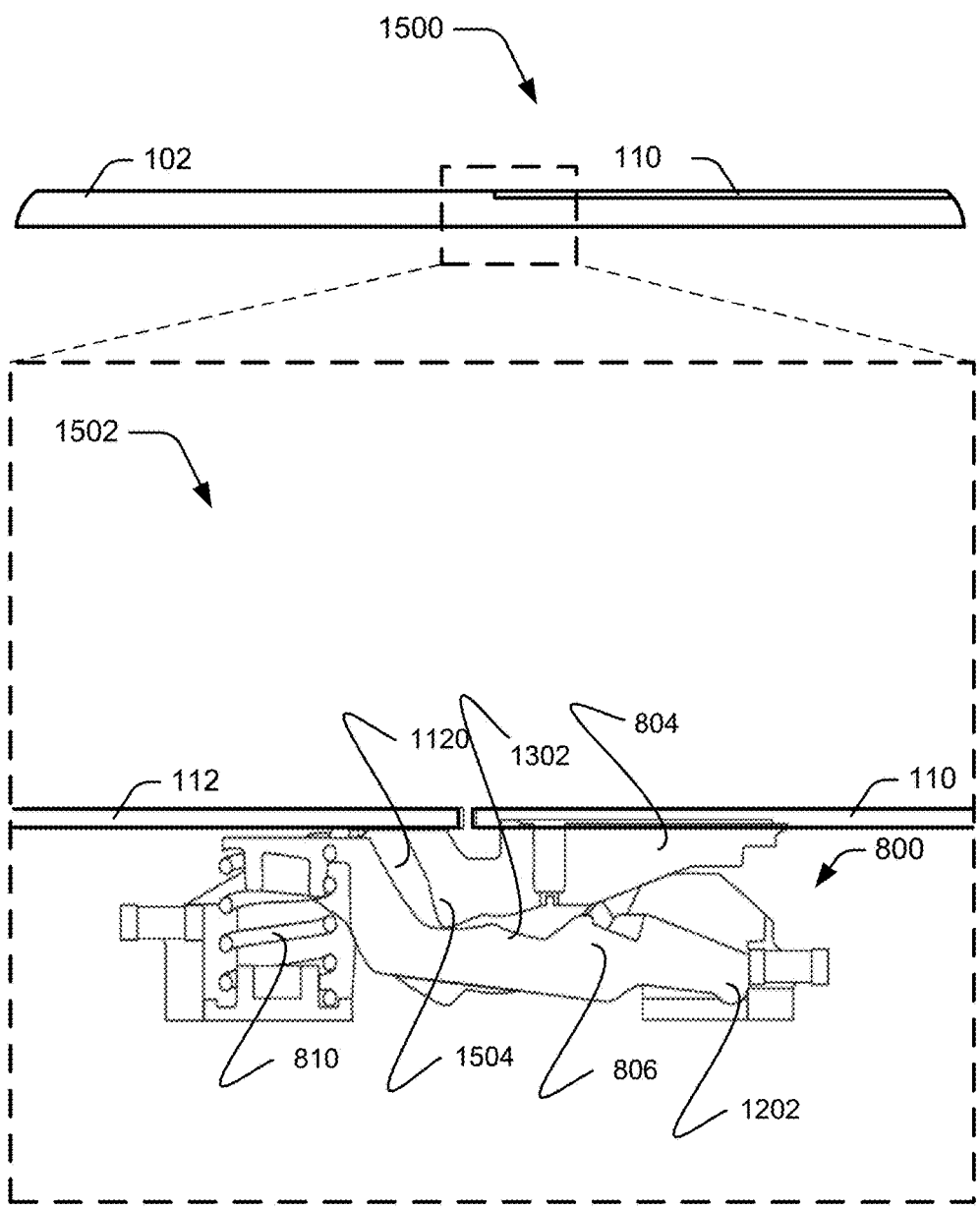
FIG. 15 depicts a computing device with a support component in a closed position in accordance with one or more examples.

FIG. 15 depicts the computing device 102 with the support component 110 in a position 1500. In at least some examples, the position 1800 corresponds to a closed position for the support component 110, such as the orientation 400 discussed above with reference to FIG. 4. Further illustrated is a partial side section view 1502 of the computing device 102, including the support component 110 attached to the cam 804 of the hinge 800 in a closed position. The section view 1502, for instance, corresponds to the cross-section 1404 illustrated above. In the partial side view 1502 and subsequent views presented in subsequent figures, the hinge 800 is illustrated with the support component 110 and the portions of the rear surface 112 of the computing device 102, but without other portions of the computing device 102.

In the section view 1502, the cam 804 is sectioned lengthwise down the center, and thus the illustrated section of the cam 804 illustrates a surface profile of the inner cam surface 1400, introduced above. The cam follower 806 is also sectioned lengthwise down the center, and thus the illustrated section of the cam follower 806 illustrates a surface profile of the inner follower surface 1302.

In the position 1500, force applied by the hinge spring 810 holds the cam follower 806 against the cam 804. Further, the interface between the cam follower 806 and the cam 804 is such that movement of the support component 110 is resisted. For instance, the inner follower surface 1302 presses against an inner cam contact 1504, and the hinge spring 810 resists rotational movement of the cam follower 806 on the follower pivot 1202. Thus, absent force applied by a user to the support component 110, pressure from the cam follower 806 against the cam 804 holds the support component 110 in a closed position against the computing device 102.

Figure 16:
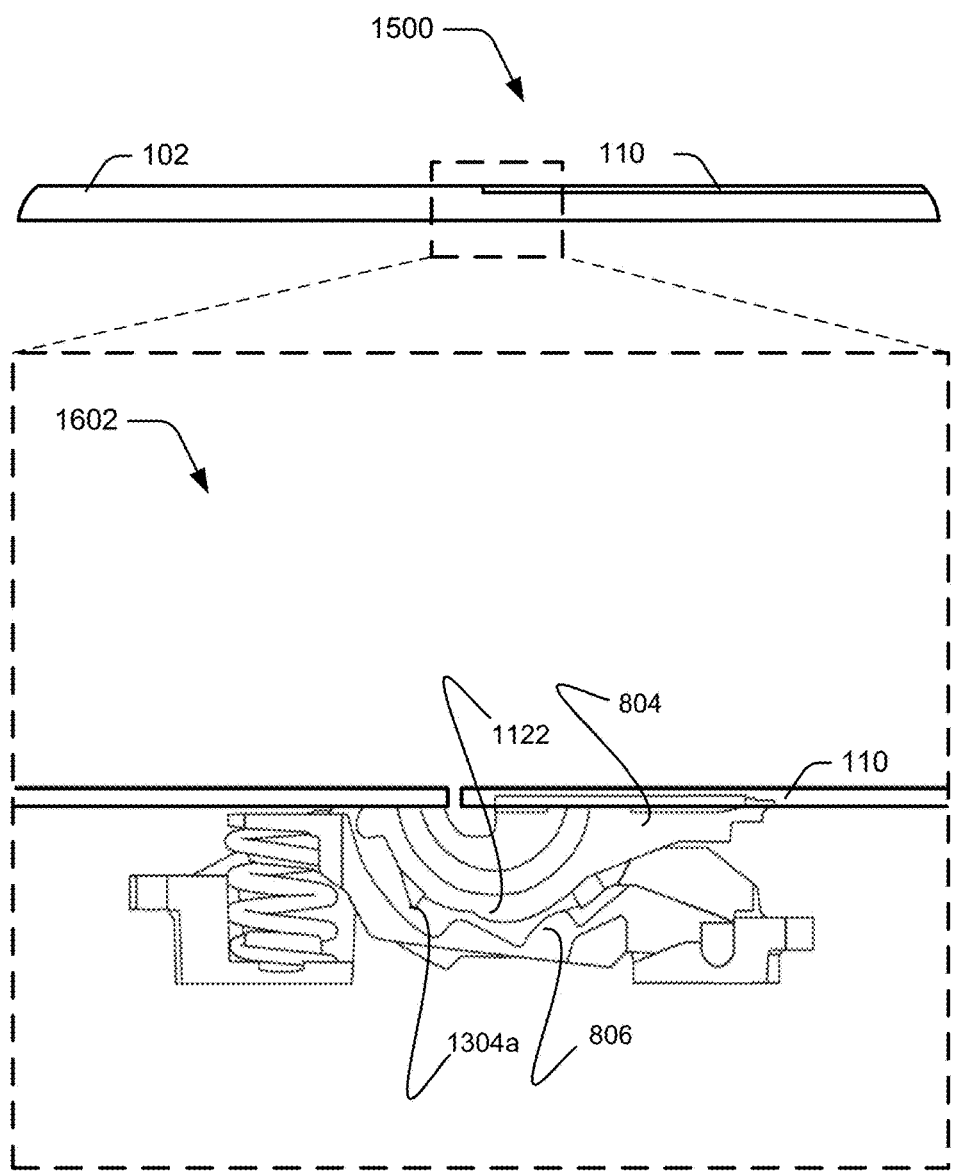
FIG. 16 depicts a computing device with a support component in a closed position in accordance with one or more examples.

FIG. 16 depicts the computing device 102 with the support component 110 in the position 1500, introduced above. Further illustrated is a partial side section view 1602 of the computing device 102, including the support component 110 attached to the cam 804 of the hinge 800 in a closed position. The section view 1602, for instance, corresponds to the cross-section 1402 illustrated above.

Illustrated as part of the section view 1602 are the outer follower surface 1304a of the cam follower 806, and the outer cam surface 1102 of the cam 804. As illustrated, in the position 1500 (e.g., a closed position), the outer follower surface 1304a does not contact the outer cam surface 1102.

Figure 17:
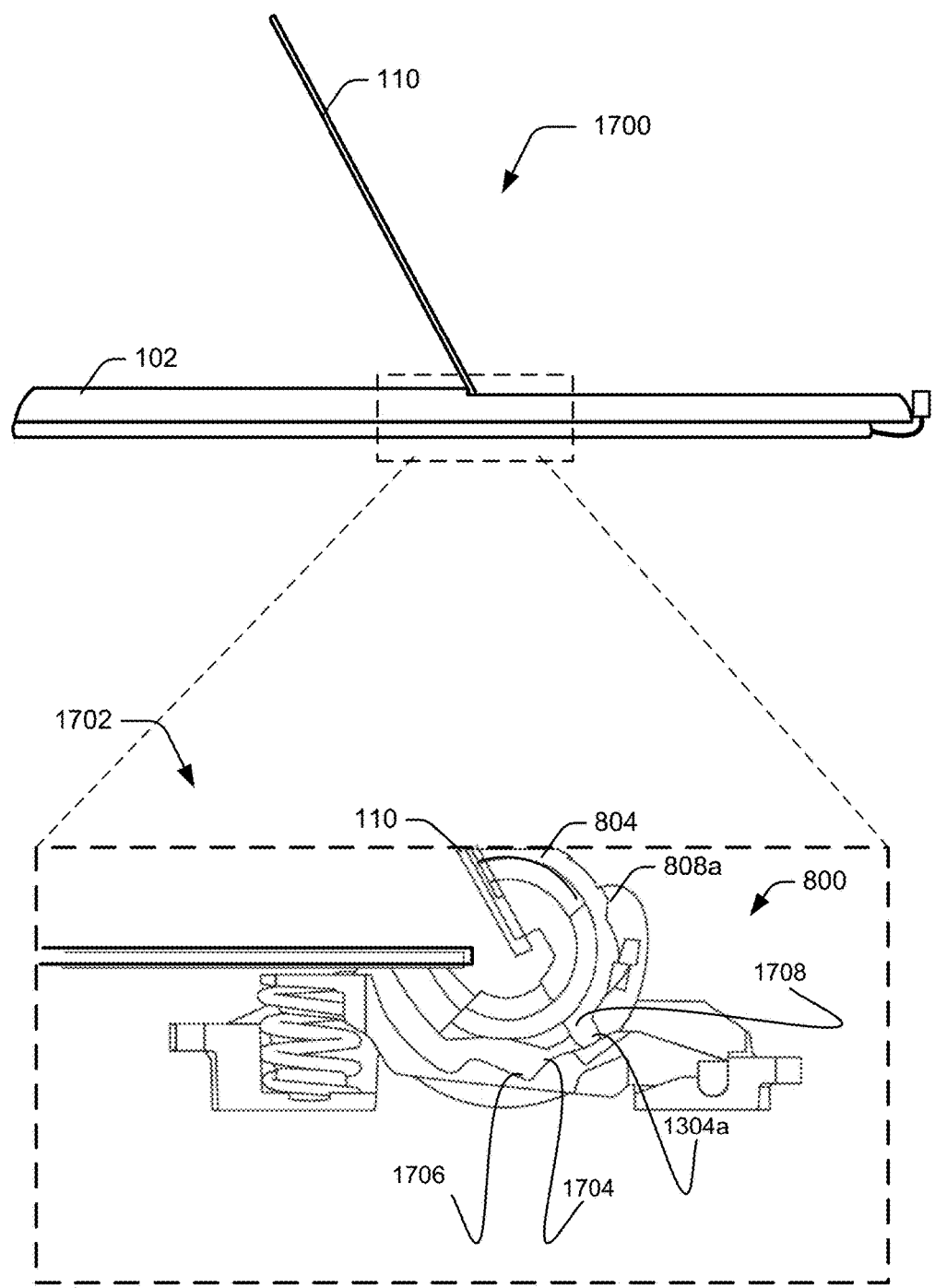
FIG. 17 depicts a support component in a third preset open position in accordance with one or more examples.

FIG. 17 depicts the support component 110 in a position 1700. In at least some examples, the position 1700 corresponds to a preset open position for the support component 110. Further illustrated is a partial side section view 1702 of the computing device 102, including the support component 110 attached to the cam 804 of the hinge 800 in a third open position. The section view 1702, for instance, corresponds to the cross-section 1402 illustrated above.

Movement of the cam 804 to the position 1700, for instance, is based on the interface between the protrusion guide 1112 of the support plate 808a and the cam guide or channel 1124 of the cam 804. As noted above, at least one surface element may be positioned on a surface of the protrusion guide 1112 or the surface of the cam channel 1124 to minimize or eliminate any free play between the support plate 808a and the cam 804.

According to various implementations, movement of the support component 110 to the position 1700 is initially resisted by pressure from a follower catch 1706 against a first cam catch 1708. However, when movement of the cam catch 1708 proceeds past an outer follower point 1704, pressure from the outer follower surface 1304a against the cam catch 1708 drives the cam 804 to the position 1700. In the position 1700, the cam catch 1708 engages with the outer follower surface 1304a.

In such a case, the sloped profile of the outer follower surface 1304a is such that pressure from outer follower surface 1304a (provided by the hinge spring 810) against the cam catch 1708 drives the cam 804 and thus the support component 110 into the position 1700 independent of an externally applied (e.g., user-applied) force.

For example, the hinge 800 is constructed such that unless a specified threshold force is applied to the support component 110, the hinge 800 will not disengage from the position 1700.

Figure 18:
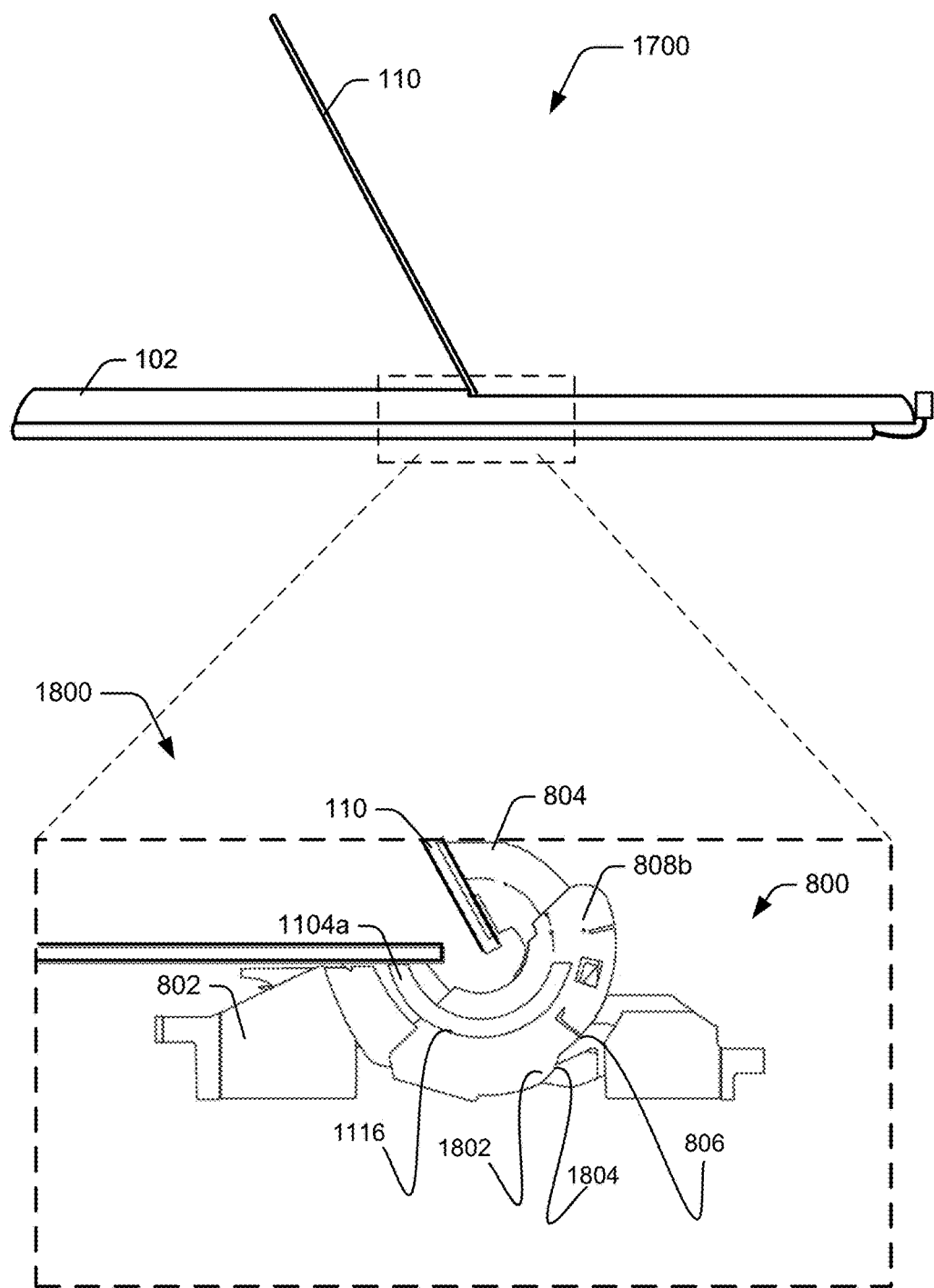
FIG. 18 depicts a support component in a third preset open position in accordance with one or more examples.

FIG. 18 depicts the support component 110 in the position 1700 introduced above. Further illustrated is a partial side section view 1800 of the computing device 102, including the support component 110 attached to the cam 804 of the hinge 800 in a third open position. The section view 1800, for instance, corresponds to the cross-section 1400 illustrated above.

As illustrated here, in the position 1700 the support plate 808b partially protrudes from the hinge frame 802. Movement of the support plate 808b to the position 1700, for instance, is based on the interface between the protrusion guide 1104a of the hinge frame 802 and the support channel 1116 of the support plate 808b. As noted above, at least one surface element may be positioned on a surface of the protrusion guide 1104a or the surface of the support channel 1116 to minimize or eliminate any free play between the hinge frame 802 and support plate 808b.

Further, a plate catch 1802 of the support plate 808b engages with a follower contact 1804 of the cam follower 806. The plate catch 1802, for instance, represents a raised portion of the outer edge of the support plate 808b. According to various implementations, engagement of the plate catch 1802 with the follower contact 1804 provides resistance to the support plate 808b rotating toward a further open position unless sufficient force is applied to the support component 110.

For instance, engagement of the plate catch 1802 with the follower contact 1804 enables the support component 110 to persist in the position 1700. Spring pressure from the hinge spring 810, for example, holds the follower contact 1804 against the plate catch 1802 and thus prevents the support plate 808b and thus the support component 110 from disengaging from the position 3000 unless sufficient external force is applied.

Figure 19:
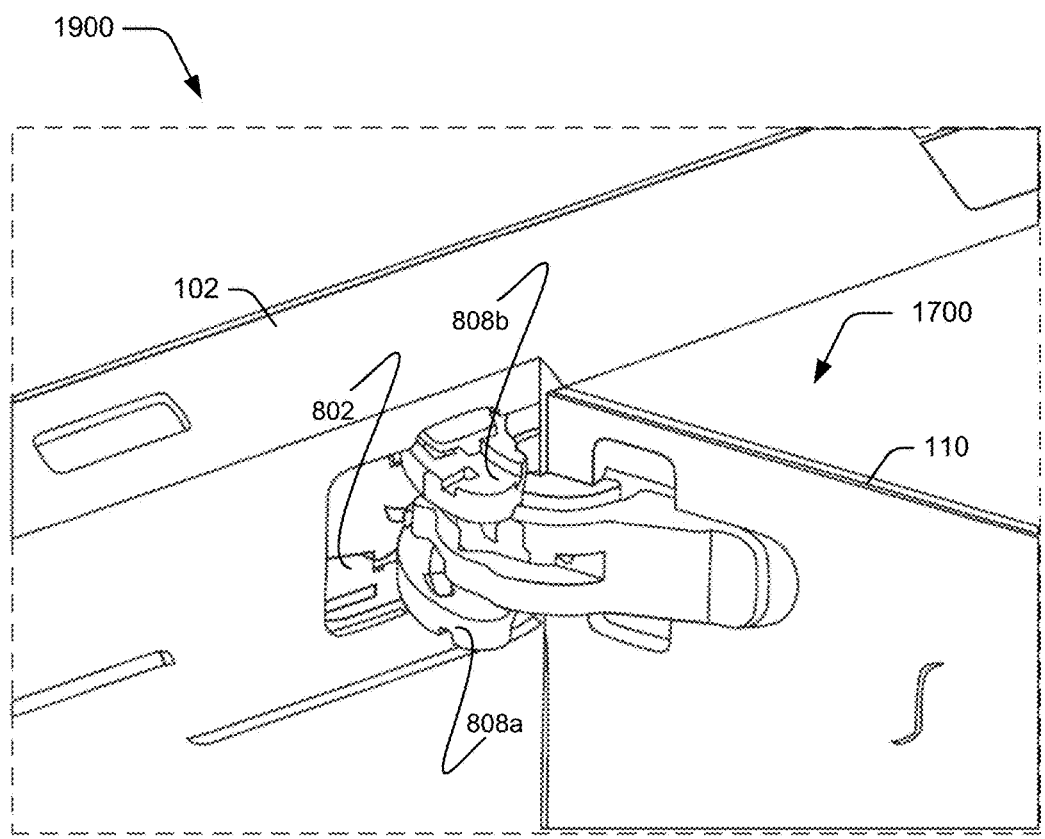
FIG. 19 depicts a partial rear view of a computing device in accordance with one or more examples.

FIG. 19 depicts a partial rear view 1900 of the computing device 102 with the support component 110 in the position

1700. The rear view 1900 depicts that in the position 1700, the support plates 808a, 808b partially protrude from the hinge frame 802.

Accordingly, examples discussed herein provide a stable hinge mechanism that enables an attached component (e.g., a support component or kickstand) to be adjusted between multiple positions. It is to be appreciated that the example device orientations, support component positions, hinge positions, and so forth discussed above are presented for purposes of example only. Thus, a wide variety of different device orientations, support component positions, hinge positions, hinge preset positions, and torque values not specifically mentioned herein may be implemented within the spirit and scope of the claimed examples.

For instance, an attachment mechanism used to attach a support component to a computing device (e.g., the hinge 800 discussed above) may include any number and/or configuration of suitable preset stop positions to enable the support component to be opened to a variety of different positions to support various orientations of a computing device. Further, example hinges may be attached at any suitable position and/or portion of a support component and/or computing device in accordance with the claimed examples.

Figure 20:
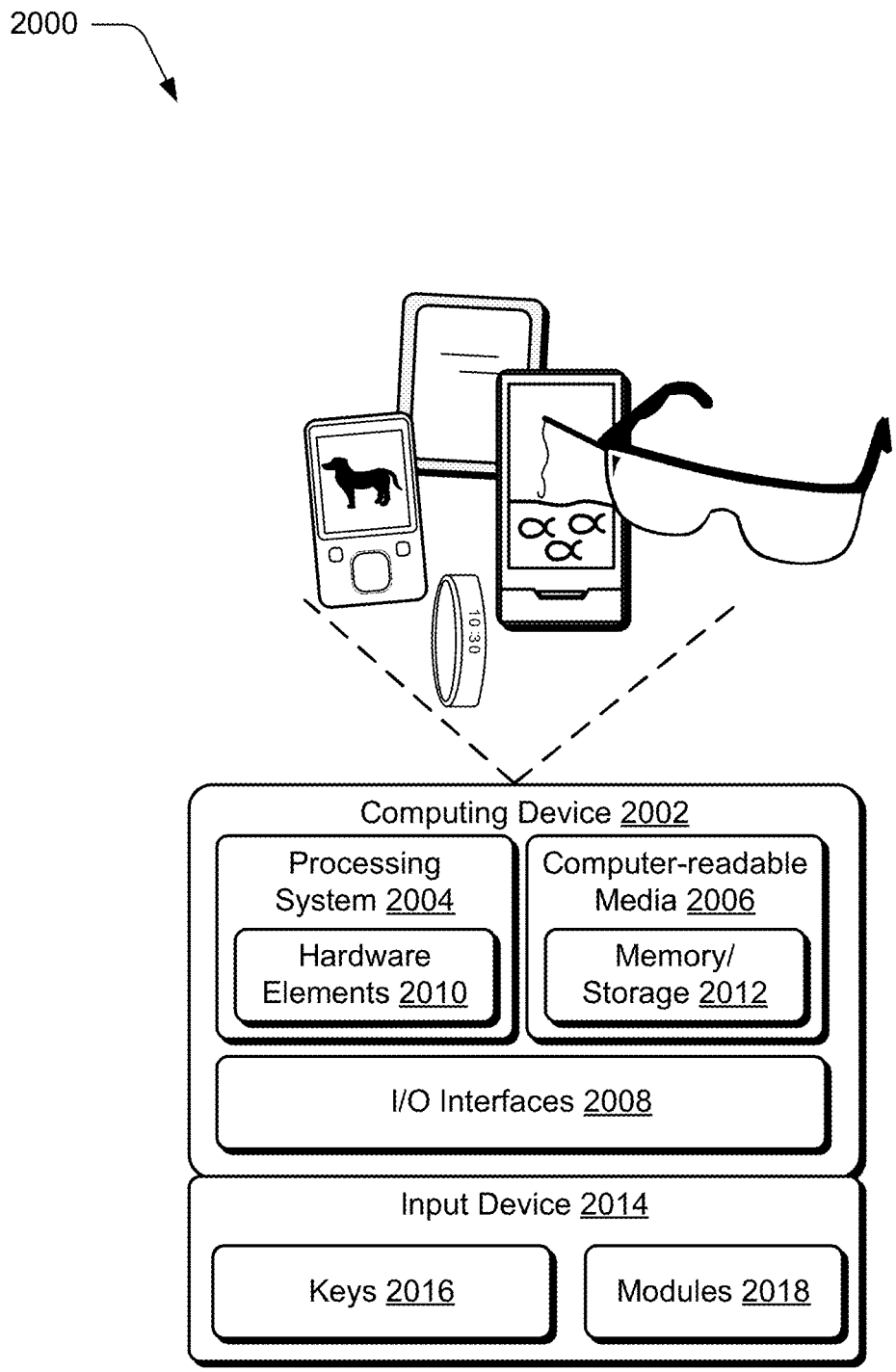
FIG. 20 depicts an example system including various components of an example device that may be implemented as any type of computing device as described with reference to FIGS. 1-19 to implement examples of the techniques described herein.

FIG. 20 depicts an example system 2000 that includes an example computing device 2002 that is representative of one or more computing systems and/or devices that may implement the various techniques described herein. In at least some implementations, the computing device 2002 represents an implementation of the computing device 102 discussed above. The computing device 2002 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the computing device 102 may be implemented as a wearable device, such as a smart watch, smart glasses, and so forth.

The example computing device 2002 as illustrated includes a processing system 2004, one or more computer-readable media 2006, and one or more I/O interface 2008 that are communicatively coupled, one to another. Although not shown, the computing device 2002 may further include a system bus or other data and command transfer system that couples the various components, one to another. A system bus may include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2004 is representative of functionality to perform one or more operations using hardware. Accordingly, the processing system 2004 is illustrated as including hardware element 2010 that may be configured as processors, functional blocks, and so forth. This may include implementation in hardware as an application specific integrated circuit or other logic device formed using one or more semiconductors. The hardware elements 2010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2006 is illustrated as including memory/storage 2012. The memory/storage 2012 represents memory/storage capacity associated with one or more computer-readable media. The memory/storage component 2012 may include volatile media (such as random access memory (RAM)) and/or nonvolatile media (such as read only memory (ROM), Flash memory, optical disks, magnetic disks, and so forth). The memory/storage component 2012 may include fixed media (e.g., RAM, ROM, a fixed hard drive, and so on) as well as removable media (e.g., Flash memory, a removable hard drive, an optical disc, and so forth). The computer-readable media 2006 may be configured in a variety of other ways as further described below.

Input/output interface(s) 2008 are representative of functionality to allow a user to enter commands and information to computing device 2002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2002 may be configured in a variety of ways to support user interaction.

The computing device 2002 is further illustrated as being communicatively and physically coupled to an input device 2014 that is physically and communicatively removable from the computing device 2002. In this way, a variety of different input devices may be coupled to the computing device 2002 having a wide variety of configurations to support a wide variety of functionality. In this example, the input device 2014 includes one or more keys 2016, which may be configured as pressure sensitive keys, mechanically switched keys, and so forth.

The input device 2014 is further illustrated as include one or more modules 2018 that may be configured to support a variety of functionality. The one or more modules 2018, for instance, may be configured to process analog and/or digital signals received from the keys 2016 to determine whether a keystroke was intended, determine whether an input is indicative of resting pressure, support authentication of the input device 2014 for operation with the computing device 2002, and so on.

Various techniques may be described herein in the general context of software, hardware elements, or program modules. Such modules may include routines, programs, objects, elements, components, data structures, and so forth that perform particular tasks or implement particular abstract data types. The terms "module," "functionality," and "component" may be used herein to represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2002, such as via a network. Signal media may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2010 and computer-readable media 2006 are representative of modules, programmable device logic and/or fixed device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2010. The computing device 2002 may be configured to implement particular instructions and/or functions corresponding to the software and/or hardware modules. Accordingly, implementation of a module that is executable by the computing device 2002 as software may be achieved at least partially in hardware, e.g., through use of computer-readable storage media and/or hardware elements 2010 of the processing system 2004. The instructions and/or functions may be executable/operable by one or more articles of manufacture (for example, one or more computing devices 2002 and/or processing systems 2004) to implement techniques, modules, and examples described herein.

While the present claim scope has been described with reference to specific examples, which are intended to be illustrative only and not to be limiting of the claim scope, it will be apparent to those of ordinary skill in the art that changes, additions and/or deletions may be made to the disclosed examples without departing from the spirit and scope of the claims.

The foregoing description is given for clearness of understanding only, and no unnecessary limitations should be understood therefrom, as modifications within the scope of the claims may be apparent to those having ordinary skill in the art.

Claim Support Section

In a first embodiment, a hinge comprises a first hinge component having a first guide; and a second hinge component having a second guide, wherein the second hinge component is rotatably mounted on at least one surface of the first hinge component such that the first guide is positioned within the second guide or the second guide is positioned within the first guide, wherein at least one surface element is disposed on a surface of the first guide or a surface of the second guide to provide a reduction in free play at a location of the at least one surface element.

In a second embodiment, a hinge comprises a hinge frame configured to be connected to a chassis of an electronic device; a cam configured to be connected to a support component of the electronic device, wherein the cam is in communication with the hinge frame; a telescoping link having a first end and a second end, the first end being pivotally connected to the cam or a hinge component connected to the cam, an anchor link having a first end and a second end, the first end being pivotally connected to the hinge frame and the second end having an opening, wherein the second end of the telescoping link is positioned within the opening of the anchor link and is configured to slide within the opening between the first end and the second end of the anchor link as the cam moves between a plurality of positions relative to the hinge frame, and wherein a surface element is disposed on a surface of the telescoping link or a surface of the anchor link to provide a reduction in free play at a location of the surface element as the telescoping link slides within the opening.

In a third embodiment, an electronic device comprises a chassis; a support component; and a hinge configured to pivotally connect the support component with the chassis, the hinge being positionable in a plurality of positions relative to the chassis. The hinge comprises a hinge frame connected to the chassis, the hinge frame having a hinge guide; at least one support plate having a first support plate guide positioned on a first surface and a second support plate guide positioned on a second surface of the at least one support plate, the second surface being an opposite surface of the first surface, wherein the at least one support plate is rotatably mounted on a surface of the hinge frame such that the first support plate guide is positioned within the hinge guide or the hinge guide is positioned within the first support plate guide, defining a first interaction; and a cam connected to the support component, the cam having a cam guide, wherein the cam is rotatably mounted on a surface of the at least one support plate such that the cam guide is positioned within the second support plate guide or the second support plate guide is positioned within the cam guide, defining a second interaction, wherein a surface element is disposed on a surface of one or more of the hinge guide, the first support plate guide, the second support plate guide, or the cam guide to provide a reduction in free play at a location of the surface element of the first interaction or the second interaction.

In a fourth embodiment, with reference to any of embodiments 1-3, the reduction in free play is a form fit at the location of the surface element.

In a fifth embodiment, with reference to any of embodiments 1-4, the reduction in free play is an interference fit at the location of the surface element.

In a sixth embodiment, with reference to any of embodiments 1-5, the at least one surface element is disposed on the surface of the first guide or the surface of the second guide such that the first guide abuts the second guide at the surface element throughout a rotation of the second hinge component about first hinge component.

In a seventh embodiment, with reference to any of embodiments 1-6, the at least one surface element is at least one raised bump, wherein each bump is in a shape of a half-sphere.

In an eighth embodiment, with reference to the seventh embodiment, the at least one raised bump is a same material as the surface of the first guide or the surface of the second guide to which the at least one raised bump is attached.

In a ninth embodiment, with reference to the seventh embodiment, the at least one raised bump is a polymer composition adhered to the surface of the first guide or the surface of the second guide.

In a tenth embodiment, with reference to any of embodiments 1-9, the at least one surface element comprises a thermoplastic polymer composition molded over at least a portion of the surface of the first guide or at least a portion of the surface of the second guide.

In an eleventh embodiment, with reference to any of embodiments 1-10, the at least one surface element provides a coefficient of friction of 0.2 or less when the at least one surface element interacts with an opposing guide surface.

In a twelfth embodiment, with reference to any of embodiments 1-11, the at least one surface element comprises a metal coating composition having a Mohs hardness of 4 or less.

In a thirteenth embodiment, with reference to any of embodiments 1-12, the first hinge component is a hinge frame configured to be connected to a surface of a computing device, and the second hinge component is a support plate apparatus comprising a first support plate mounted on a first surface of the hinge frame and a second support plate mounted on a second, opposing surface of the hinge frame.

In a fourteenth embodiment, with reference to any of embodiments 1-12, the first hinge component is a hinge frame, and the second hinge component is a support plate.

In a fifteenth embodiment, with reference to any of embodiments 1-12, the first hinge component is a support plate, and the second hinge component is a cam.

In a sixteenth embodiment, with reference to the second embodiment, the surface element is at least one raised bump or a thermoplastic polymer composition molded over at least a portion of the surface of the telescoping link or at least a portion of the surface of the anchor link.

In a seventeenth embodiment, with reference to the second or sixteenth embodiment, the hinge further comprises at least one support plate, wherein the hinge frame comprises a hinge guide, wherein the at least one support plate comprises a first support plate guide positioned on a first surface and a second support plate guide positioned on a second surface of the at least one support plate, the second surface being an opposite surface of the first surface, wherein the at least one support plate is rotatably mounted on a surface of the hinge frame such that the first support plate guide is positioned within the hinge guide or the hinge guide is positioned within the first support plate guide, defining a first interaction; wherein the cam comprises a cam guide, wherein the cam is rotatably mounted on a surface of the at least one support plate such that the cam guide is positioned within the second support plate guide or the second support plate guide is positioned within the cam guide, defining a second interaction, and wherein an additional surface element is disposed on a surface of the hinge guide, the first support plate guide, the second support plate guide, or the cam guide to provide a reduction in free play at a location of the additional surface element of the first interaction or the second interaction.

In an eighteenth embodiment, with reference to the seventeenth embodiment, the additional surface element comprises a first surface element disposed on the hinge guide or the first support plate guide, and a second surface element disposed on the second support plate guide or the cam guide.

In a nineteenth embodiment, with reference to the seventeenth embodiment, the additional surface element is disposed on the hinge guide or the first support plate guide such that the hinge guide abuts the first support plate guide at the surface element throughout a rotation of the at least one support plate about the hinge plate.

In a twentieth embodiment, with reference to the seventeenth embodiment, the additional surface element is disposed on the second support plate guide or the cam guide such that the second support plate guide abuts the cam guide at the surface element throughout a rotation of the cam about the at least one support plate.

In a twenty-first embodiment, with reference to any of embodiments 1-20, the hinge further comprises a telescoping link having a first end and a second end, the first end being pivotally connected to the cam or a hinge component connected to the cam; and an anchor link having a first end and a second end, the first end being pivotally connected to the hinge frame and the second end having an opening, wherein the second end of the telescoping link is positioned within the opening of the anchor link and is configured to slide within the opening between the first end and the second end of the anchor link as the cam moves between a plurality of positions relative to the hinge frame, and wherein an additional surface element is disposed on a surface of the telescoping link or a surface of the anchor link to provide a reduction in free play at a location of the additional surface element as the telescoping link slides within the opening.

What is claimed is:
1. A hinge comprising:
a hinge frame configured to be connected to a chassis of an electronic device;
a cam configured to be connected to a support component of the electronic device, wherein the cam is in communication with the hinge frame;
a cam follower configured for interaction with the cam during a user manipulation of the support component;
a telescoping link having a first end and a second end, the first end being pivotally connected to the cam follower;
an anchor link having a first end and a second end, the first end being pivotally connected to the hinge frame and the second end having an opening; and
at least one support plate,
wherein the hinge frame comprises a hinge guide,
wherein the at least one support plate comprises a first support plate guide positioned on a first surface and a second support plate guide positioned on a second surface of the at least one support plate, the second surface being an opposite surface of the first surface, wherein the at least one support plate is rotatably mounted on a surface of the hinge frame such that the first support plate guide is positioned within the hinge guide or the hinge guide is positioned within the first support plate guide, defining a first interaction, wherein the cam comprises a cam guide, wherein the cam is rotatably mounted on a surface of the at least one support plate such that the cam guide is positioned within the second support plate guide or the second support plate guide is positioned within the cam guide, defining a second interaction, wherein the second end of the telescoping link is positioned within the opening of the anchor link and is configured to slide within the opening between the first end and the second end of the anchor link as the cam moves between a plurality of positions relative to the hinge frame, and wherein a surface element is disposed on a surface of the telescoping link or a surface of the anchor link to provide a reduction in free play at a location of the surface element as the telescoping link slides within the opening.

2. The hinge of claim 1, wherein the surface element is at least one raised bump or a thermoplastic polymer composition molded over at least a portion of the surface of the telescoping link or at least a portion of the surface of the anchor link.

3. The hinge of claim 1,
wherein an additional surface element is disposed on a surface of the hinge guide, the first support plate guide, the second support plate guide, or the cam guide to provide a reduction in free play at a location of the additional surface element of the first interaction or the second interaction.

4. The hinge of claim 3, wherein the additional surface element comprises a first surface element disposed on the hinge guide or the first support plate guide, and a second surface element disposed on the second support plate guide or the cam guide.

5. The hinge of claim 3, wherein the additional surface element is disposed on the hinge guide or the first support plate guide such that the hinge guide abuts the first support plate guide at the surface element throughout a rotation of the at least one support plate about the hinge plate.

6. The hinge of claim 3, wherein the additional surface element is disposed on the second support plate guide or the cam guide such that the second support plate guide abuts the cam guide at the surface element throughout a rotation of the cam about the at least one support plate.

7. The hinge of claim 1, wherein the reduction in free play is a form fit at the location of the surface element.

8. The hinge of claim 1, wherein the reduction in free play is an interference fit at the location of the surface element.

9. The hinge of claim 1, wherein the surface element is at least one raised bump, wherein each bump is in a shape of a half-sphere.

10. The hinge of claim 9, wherein the at least one raised bump is a same material as the surface of the telescoping link or the surface of the anchor link to which the at least one raised bump is attached.

11. The hinge of claim 9, wherein the at least one raised bump is a polymer composition adhered to the surface of the telescoping link or the surface of the anchor link.

12. The hinge of claim 1, wherein the surface element comprises a thermoplastic polymer composition molded over at least a portion of the surface of the telescoping link or at least a portion of the surface of the anchor link.

13. The hinge of claim 1, wherein the surface element provides a coefficient of friction of 0.2 or less when the surface element interacts with an opposing guide surface.

14. The hinge of claim 1, wherein the surface element comprises a metal coating composition having a Mohs hardness of 4 or less.

15. An electronic device comprising:
a chassis;
a support component; and
a hinge configured to pivotally connect the support component with the chassis, the hinge being positionable in a plurality of positions relative to the chassis, the hinge comprising:
a hinge frame connected to the chassis, the hinge frame having a hinge guide;
at least one support plate having a first support plate guide positioned on a first surface and a second support plate guide positioned on a second surface of the at least one support plate, the second surface being an opposite surface of the first surface, wherein the at least one support plate is rotatably mounted on a surface of the hinge frame such that the first support plate guide is positioned within the hinge guide or the hinge guide is positioned within the first support plate guide, defining a first interaction; and
a cam connected to the support component, the cam having a cam guide, wherein the cam is rotatably mounted on a surface of the at least one support plate such that the cam guide is positioned within the second support plate guide or the second support plate guide is positioned within the cam guide, defining a second interaction,
a cam follower configured for interaction with the cam during a user manipulation of the support component;
a telescoping link having a first end and a second end, the first end being pivotally connected to the cam follower; and
an anchor link having a first end and a second end, the first end being pivotally connected to the hinge frame and the second end having an opening,
wherein the second end of the telescoping link is positioned within the opening of the anchor link and is configured to slide within the opening between the first end and the second end of the anchor link as the cam moves between a plurality of positions relative to the hinge frame, and
wherein a surface element is disposed on a surface of one or more of the hinge guide, the first support plate guide, the second support plate guide, or the cam guide to provide a reduction in free play at a location of the surface element of the first interaction or the second interaction.

16. The electronic device of claim 15,
wherein an additional surface element is disposed on a surface of the telescoping link or a surface of the anchor link to provide a reduction in free play at a location of the additional surface element as the telescoping link slides within the opening.

17. The electronic device of claim 16, wherein the reduction in free play is a form fit at the location of the surface element.

18. The electronic device of claim 16, wherein the reduction in free play is an interference fit at the location of the surface element.

19. The electronic device of claim 16, wherein the surface element is at least one raised bump, wherein each bump is in a shape of a half-sphere.

* * * * *